United States Patent [19]
Jensen

[11] 3,750,108
[45] July 31, 1973

[54] SELF-CLOCKING RECORD SENSING SYSTEM

[75] Inventor: Alan K. Jensen, Livingston, N.J.

[73] Assignee: Litton Business Systems, Inc., Morristown, N.J.

[22] Filed: Feb. 12, 1971

[21] Appl. No.: 115,044

Related U.S. Application Data
[63] Continuation of Ser. No. 857,603, Sept. 12, 1969, abandoned.

[52] U.S. Cl.. 340/172.5, 340/174.1 A, 340/174.1 H
[51] Int. Cl.......................... G06f 1/04, G11b 27/24
[58] Field of Search................ 340/172.5, 174.1 H, 340/174.1, 174.1 A; 179/100.2 HT; 328/151; 307/238, 246, 262, 265, 269, 231-236

[56] References Cited
UNITED STATES PATENTS

| | | | |
|---|---|---|---|
| 3,191,058 | 10/1961 | Stone | 307/234 X |
| 3,395,391 | 7/1968 | Gorog et al. | 340/172.5 |
| 3,138,759 | 6/1964 | Thompson | 307/234 X |
| 2,972,735 | 2/1961 | Fuller et al. | 340/174.1 H |
| 3,331,026 | 7/1967 | Parker | 307/235 X |

*Primary Examiner*—Harvey E. Springborn
*Attorney*—Norman Friedman, David Teschner, Morris I. Pollack, Arthur T. Groeninger, Stephen E. Feldman and Elmer W. Edwards

[57] ABSTRACT

The system comprises a pair of timing circuits which, through logic circuitry, are alternately charged by incoming signals derived from a peak detector. The output signals of the timing circuits are so spaced as to provide a period of time within which a signal of a variable frequency signal train may be sampled. The circuitry is provided in order to enable the system to go from a quiescent condition to an operating condition and finally, when no proper signals are received within a predetermined time, return to the quiescent condition.

10 Claims, 14 Drawing Figures

FIG. 1

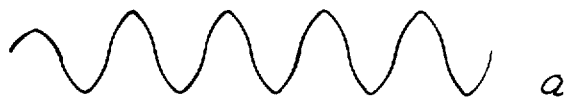
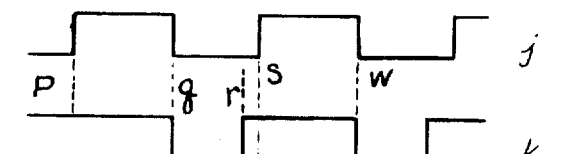
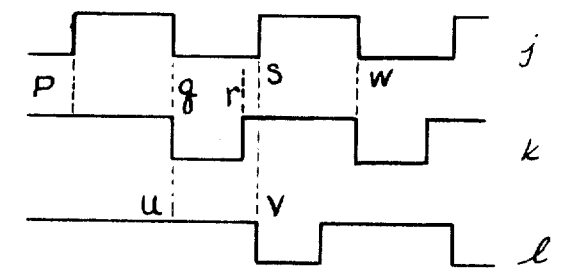
FIG. 2 a) IN
b) COLLECTOR OF TRANSISTOR 300
c) COLLECTOR OF TRANSISTOR 302
d) EMITTER OF TRANSISTOR 312
e) COLLECTOR OF TRANSISTOR 316
f) IP

INVENTOR
ALAN K. JENSEN

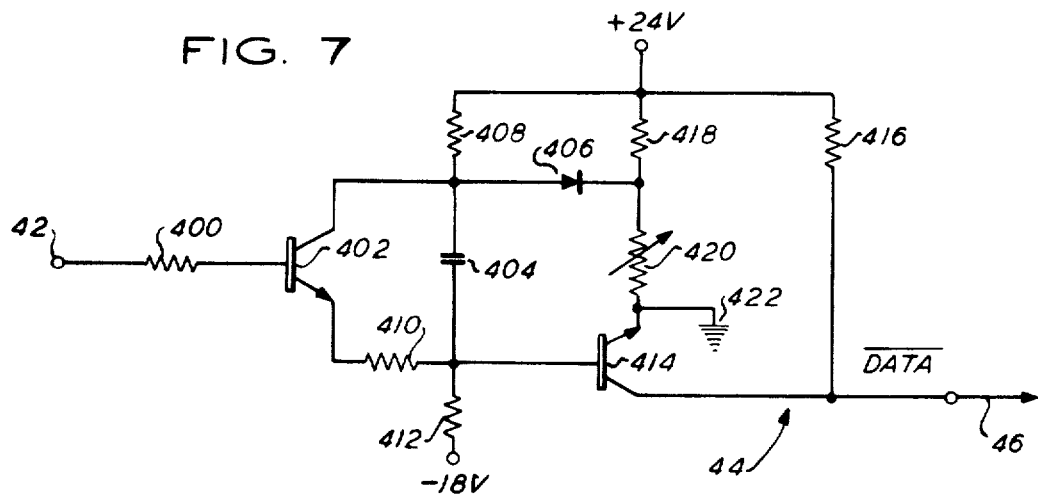
FIG. 7
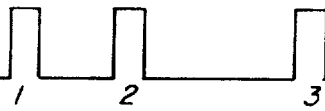
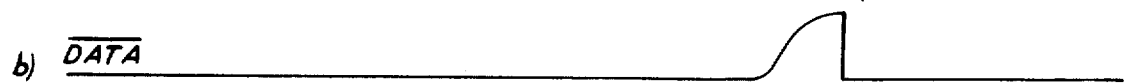
FIG. 8
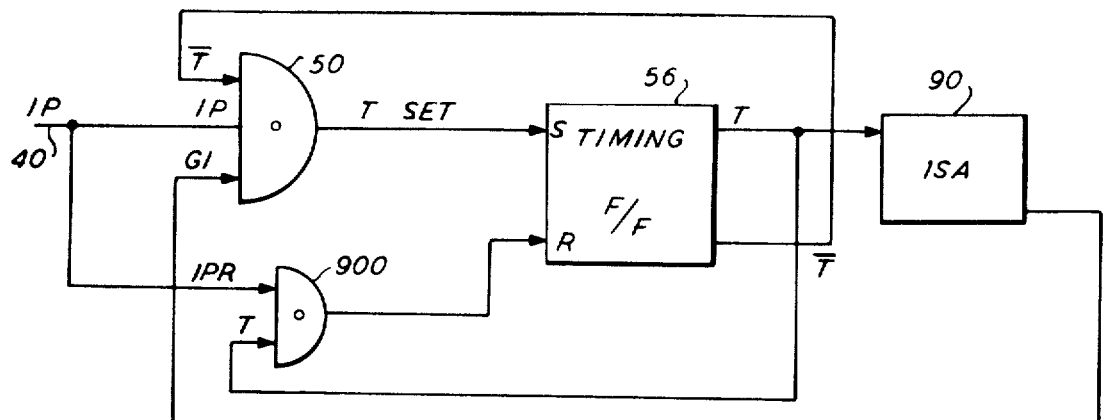
FIG. 9
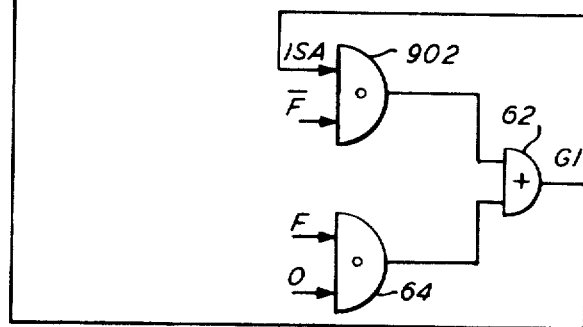
INVENTOR
ALAN K. JENSEN
BY
ATTORNEY

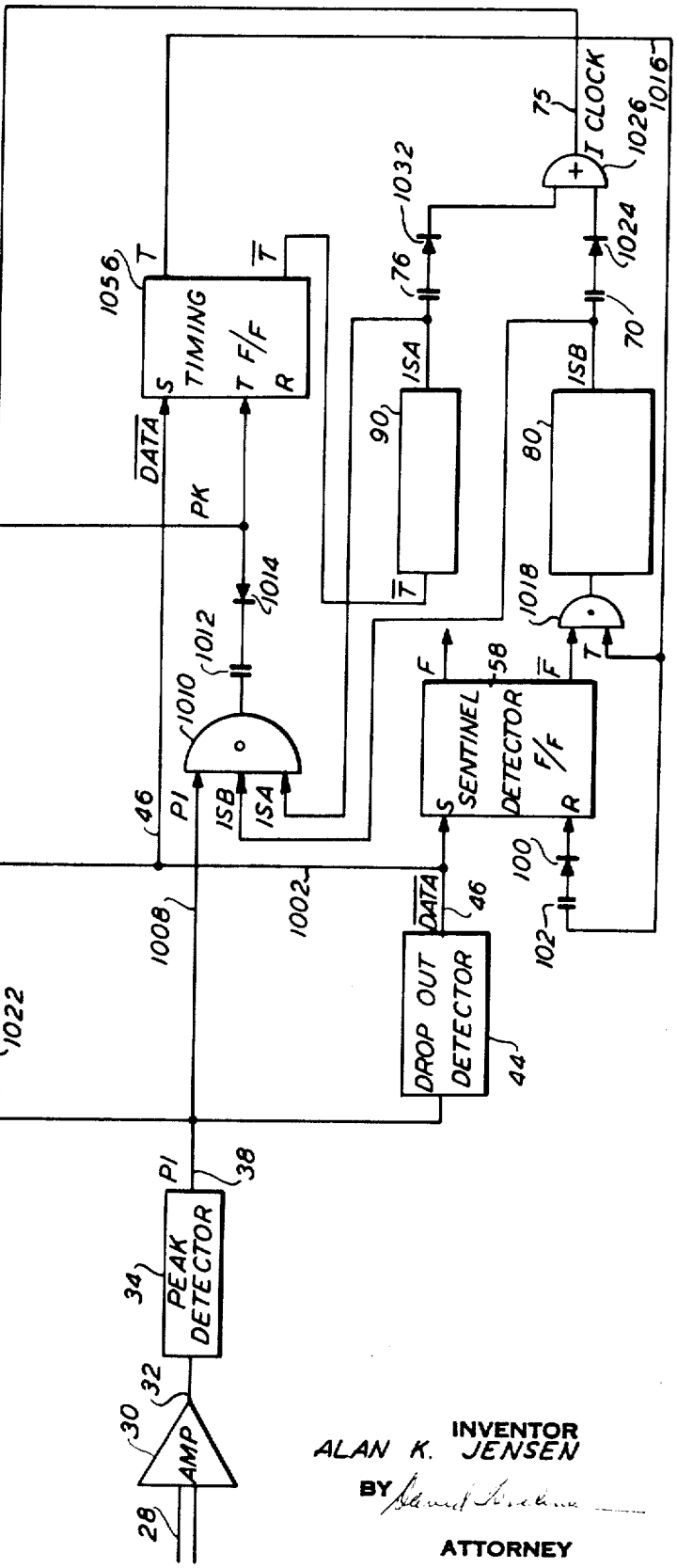
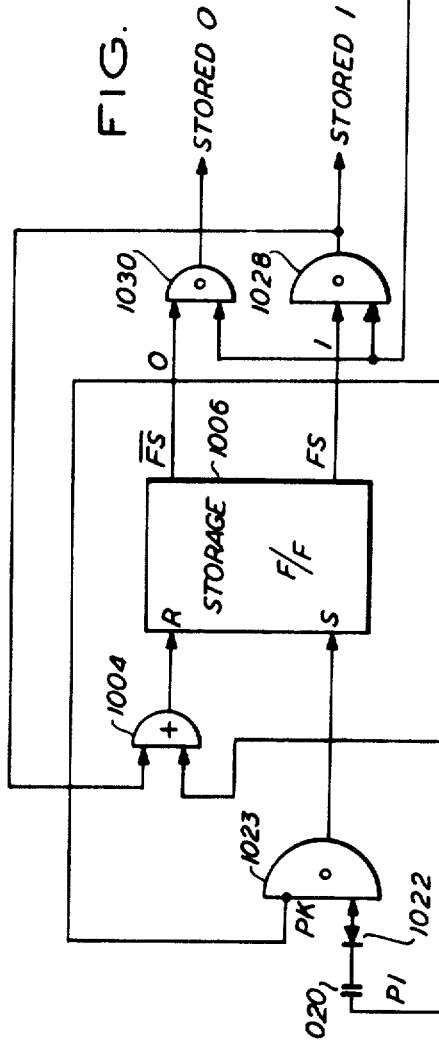
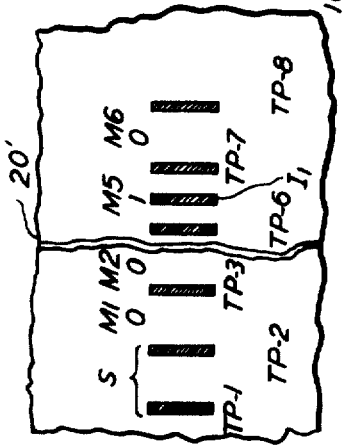

INVENTOR
ALAN K. JENSEN
BY David Toothe
ATTORNEY

SELF-CLOCKING RECORD SENSING SYSTEM

The present application is a continuation of U.S. Pat. application Ser. No. 857,603 filed Sept. 12, 1969 now abandoned, and which in turn is a continuation of U.S. Pat. application Ser. No. 529,115, filed Feb. 21, 1966 and also abandoned.

This invention relates to a self-clocking record sensing system and more particularly to a self-clocking record sensing system wherein the time of sensing of the individual signals of a variable frequency signal train upon a record may be adjusted for each successive signal in dependence upon the time relationships between previous signals of said train.

There exists in the computer and data processing field today a problem of transferring data from a record, bearing such data, to a computer or data processing system where the various elements of the sensing and record media cannot be accurately controlled or timed. Such a condition exists when a record is moving at a continuously varying rate while being read. For example, the movement of a magnetic tape which, depending upon whether it is accelerating or decelerating or running at a constant speed, will show varying rates of speed as it passes the sensing head. This problem also exists when the sensing member itself is nonstationary, and is moved with respect to the record such as where a handheld reading or sensing device is moved adjacent to a stationary record. This problem is also present when a combination of a movable record and a movable reading or sensing device is employed.

Well-known techniques of providing an internal clocking system for the data processing or computer device which is to receive such information fail to provide the necessary solution. The reason for this failure is that these systems are often synchronized with an initial portion of the record itself. Changes in the speed of motion of either the record media or the sensing head cannot be correctly accomodated by the fixed internal clock. Thus, although the timing may be correct at the beginning of the record sensing it varies greatly before very long.

One solution offered by the prior art to overcome the problem is that of the recording of a clock track adjacent to the information track or tracks, such that there is no dependence upon an internal clock for the necessary timing to permit the reading and accurate storage of information. This, however, presents the problem of accurately aligning an original clock track with the information track or tracks. It further is complicated by the fact that there must be accurate placement of a reading head with respect to both the information track or tracks, and the clock track, such that the proper information signal and clock signal are read at the same time. Skewing of the record, or skewing of the reading head, such that there is improper alignment between a clock signal and the associated information signal, will prevent the information signal from being read or understood.

The present invention overcomes the difficulties noted in the prior art by providing, in a first embodiment, a signal sensing system which utilizes the information signals to provide its own timing. Thus timing is adjustable for every signal interval in accordance with the past history of the previous two signals received by it. Stated in another way, the circuit will measure the elapsed time between the occurrence of the last two received signals and based upon this elapsed time will forecast the time of arrival of the next signal. It has been found empirically that it is highly improbable that, for example, the speed of a handheld reading means can be varied by more than approximately 10 percent in the passage of a reading means with respect to two adjacent record signals. Thus, the forecast of the time of arrival of the next signal, based upon the elapsed time between the two previous adjacent signals, should be within 10 percent of the accurate arrival time. By also providing peak detection devices to insure that a pulse will only be accepted by the system if certain predetermined amplitude conditions are met, it can be assured that spuriously generated noise pulses, regardless of their aamplitudes, cannot be accepted by the system. Since the arrival of each signal is forecasted, based upon elapsed time between the last two signals, the system tends to correct itself for increases or decreases of record or reading head speed based upon changes in the time interval for each successive two-signal period.

Additional devices, such as drop-out detectors, are employed to indicate the complete loss of information and to operate an alarm to indicate this. In addition, a sampling circuit provides necessary gating to permit signals which are received at the correct time and with the correct amplitude to be gated to a storage device for later use.

In a further embodiment of the present invention a signal sensing system employs one information and one timing signal to forecast the time of arrival of the next information signal. Although this somewhat decreases the amount of storage possible on the record, the signal sensing system is greatly simplified.

A third embodiment of the present invention employs two noninformation bearing timing signals to bracket a possible information signal. An information signal received between two adjacent timing signals is stored and held until the second timing signal is received. This sytem is particularly useful where the response of the reading means is not symmetrical for both of the two possible information conditions. For example, the response of photoelectric sensing device may vary with respect to light and dark record areas. Thus, an information signal used jointly for timing and information content might be lost. A set of timing marks on the record recorded in the manner read most reliably will assure that the timing will normally not be lost. Further, by arranging the sensing circuit to respond only to information signals similarly recorded, and if not found assuming the opposite signal value, the chance of information loss is reduced.

A further embodiment employs two timing signals prior to each information signal. These signals set the time of sensing for the information signal to follow. This system further permits a reduction of the circuitry required.

It is therefore an object of this invention to provide an improved form of signal sampling circuit.

It is another object of this invention to provide an improved form of clockless record sensing system.

It is still another object of this invention to provide a sampling system for sensing the signals of a variable frequency signal train whose time of sampling is adjusted for each successive signal based upon the elapsed time between the two previous signals received by said system.

It is yet another object of this invention to provide a sampling system for sensing the signals of a variable frequency signal train, said train containing alternate information and timing signals, said sampling system adjusting its time of sampling for the next information signal based upon the elapsed time between the previous information signal and the previous timing signal.

It is still another object of this invention to provide a sampling system for sensing the signals of a variable frequency signal train, said train containing alternate information and timing signals, said sampling system adjusting its time of sampling for the next information signal based upon the elapsed time between two adjacent timing signals and permitting the sampling of an information signal during the elapsed time between the second of said adjacent timing signals and a further timing signal.

Another object of this invention is to provide a sampling system for sensing the signals of a variable frequency signal train, said train containing information and timing signals, said signals being arranged in such train that two timing signals precede every information signal, said sampling system adjusting its time of sampling for the next information signal based upon the elapsed time between the two timing signals which precede the information signal.

It is still another object of this invention to provide a sampling system for sampling the signals of a variable frequency signal train such that it will only accept signals which occur at a prescribed time, such time being determined by the elapsed time between predetermined signals of said train, which rejects all signals which do not arrive at such predetermined time, and which do not have an amplitude in excess of a predetermined minimum value.

It is still another object of this invention to provide a storage control system for entering information to a storage means in the form of signals which meet certain predetermined criteria.

It is another object of this invention to provide a storage control device for determining the accuracy of signals received at its input and only accepting and storing those signals which are of correct amplitude and correct time distribution.

It is yet another object of this invention to provide a storage control device capable of rejecting noise signals which occur at random periods and of insufficient amplitude and to warn of the loss of all data at the input to such control system.

It is another object of this invention to provide a novel form of peak detection circuit for detecting the presence of signals of the proper amplitude regardless of their polarity.

It is yet another object of this invention to provide a unique form of variable timing control means capable of producing an output proportional to the length of time an input is appied to it.

It is still another object of this invention to provide a sensing control circuit for a handheld and hand-movable sensing means which is movable with respect to record bearing media and is capable of both determining an initial start signal pattern and to thereafter look for signals at prescribed times, such times being forecast in accordance with the elapsed time between predetermined signals.

Other objects and features of the invention will be pointed out in the following description and claims and illustrated in the accompanying drawings, which disclose, by way of example, the principles of the invention, and the best modes which have been contemplated for carrying it out.

In the drawings:

FIG. 1 is a schematic drawing of a self-clocking record sensing system constructed in accordance with the concepts of the invention.

FIG. 2 is a diagram showing the waveforms and time of application of the various inputs and outputs of the elements of FIG. 1.

FIG. 7 is a schematic diagram of the drop-out detector of FIG. 1.

FIG. 8 illustrates the waveforms and the timing of the inputs and outputs of the drop-out detector of FIG. 7.

FIG. 9 shows in diagrammatic form an alternative embodiment of the device of FIG. 1 and constructed in accordance with the concepts of this invention.

FIG. 10 shows in diagrammatic form a further alternative embodiment of the device of FIG. 1 and constructed according to the concepts of this invention.

FIG. 10a illustrates in schematic form a portion of the record to be sensed by the device of FIG. 10 and illustrating thesignal configuration thereon.

Similar elements will be given similar reference characters in each of the respective drawings.

Figure 1:
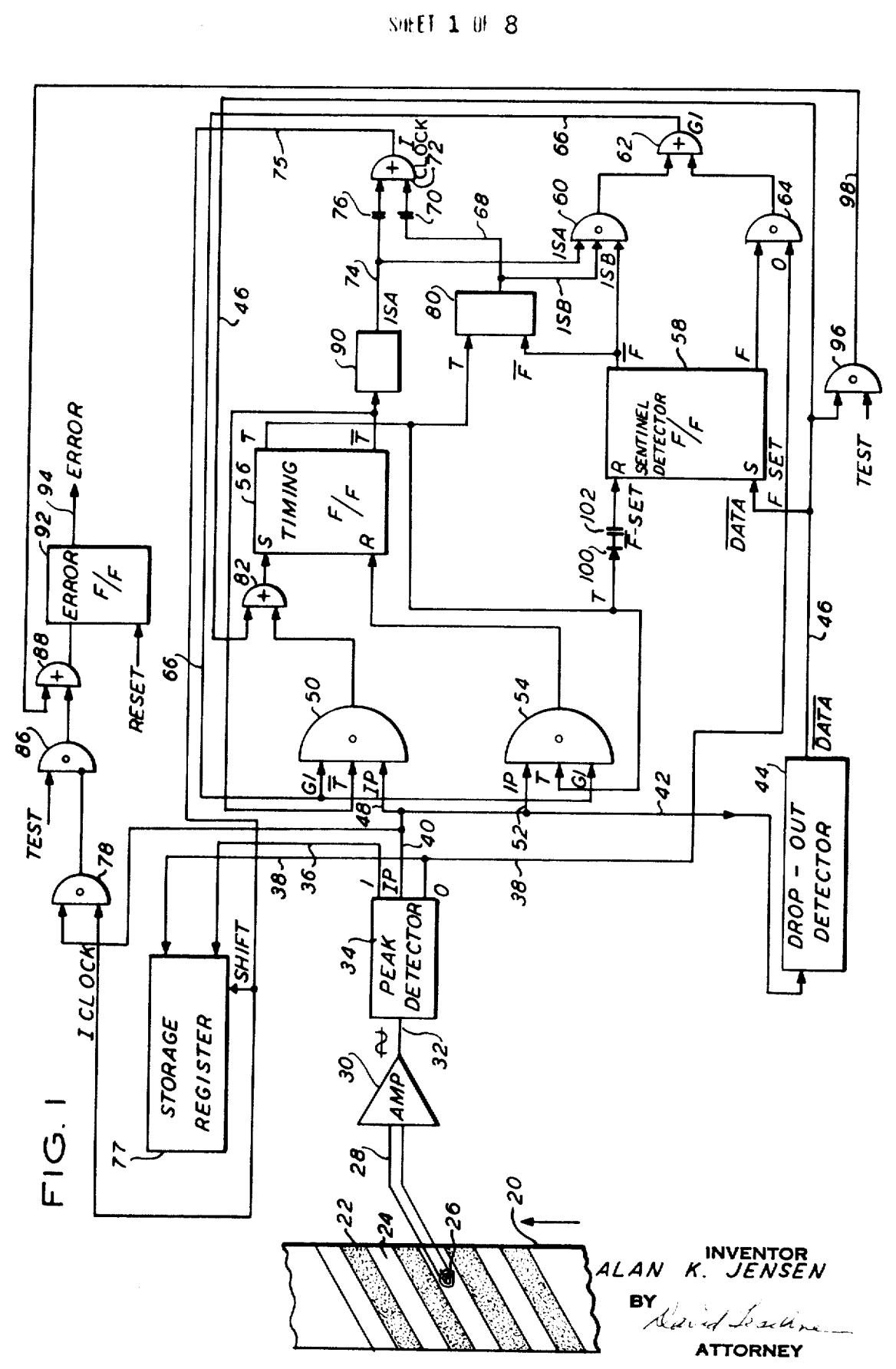
Figure 3:
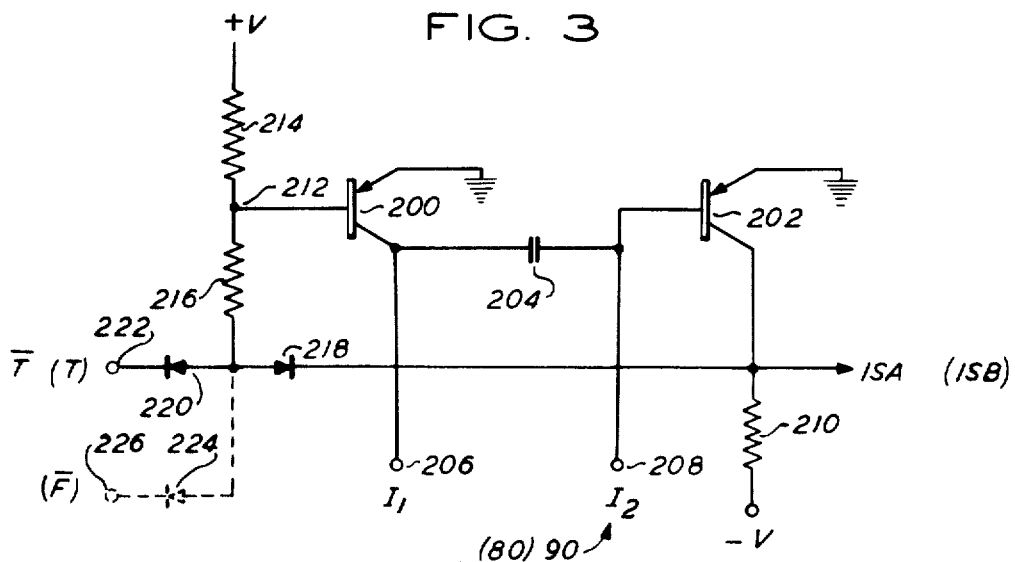
FIG. 3 is a schematic diagram of the variable timing control means of FIG. 1.

Turning now to FIG. 1, there is shown in diagrammatic form a system for the reading of information from a record bearing media. The system provides for the self-clocking sensing of the information. The record 20 of FIG. 1 may be of any form of continuous or discontinuous record bearing media such as a magnetic record card, a magnetic tape, a specially prepared tag having a magnetic coating and recording thereon, or the like. Similarly, the record bearing media may be one suitable for punching, may consist of areas of distinctive colors or color gradations, or may consist of areas having discrete conductivity. In the following example, for illustrative purposes only, the record 20 will be considered to be a merchandise tag of the type bearing certain information pertaining to the sale of goods. Such a tag will have information indicating for example, the price, type, category, style, and other items of that type. The information is recorded on the record 20 in bands 22, shown stippled to indicate the presence of a signal, regardless of whether the signal is of a positive or negative type. Blank bands 24, between the stippled bands 22, are spacing bands wherein no information should appear.

The record 20 is sensed by means of a tranducer in form of an annular positionable sensing head 26. The details of the head 26 and the manner of recording, as shown by the bands 22 and 24, are described in greater detail in copending U.S. Pat. application Ser. No. 487,866, filed Sept. 16, 1965, in the names of R. J. LaManna and A. K. Jensen, and assigned to the assignee of the instant application said application having been abandoned in favor of U.S. Pat. application Ser. No. 856,856, filed Sept. 10, 1969, which in turn was abandoned in favor of U.S. Pat. application Ser. No. 128,602 filed Feb. 12, 1971. The details of the recording technique and of the playback head are not important to the present invention and any form of recording system or reading transducer which is sufficient to sense the information contained thereon may be employed with equal utility. It should be understood that the record, may consist of a punched record, or a record having discrete opacity or reflectivity, and that the reading means may be a photoelectric device of the type described in copending U.S. Pat. application Ser. No. 487,866, filed Sept. 16, 1965, in the name of R. J. LaManna and A. K. Jensen, and assigned to the assignee of the instant invention, said application having been abandoned in favor of U.S. Pat. application Ser. No. 856,856, filed Sept. 10, 1969, which in turn was abandoned in favor of U.S. Pat. application Ser. No. 128,602 filed Feb. 12, 1971. The signals sensed by the head 26 are passed over leads 28 to an amplifier 30. It will be assumed, for the purpose of this explanation, that a 1 signal is indicated by a positive going slope of a recorded signal and a 0 signal is indicated by a negative going slope of a recorded signal. The output of the amplifier 30 is fed over line 32 to a peak detector 34.

The peak detector 34 will be described in greater detail below with respect to FIGS. 5 and 6. Outputs are available from peak detector 34 on three lines 36, 38, and 40. The first line 36 is designated the 1 line, a second line 38 designated the 0 line, and a third line 40 is, designated the IP line. A positive signal is available upon the IP line 40 whenever there is an input (whether it is a 1 or a 0 signal) to the peak detector 34. ON the line 36 there is applied a positive signal indicative of the value 1. On the 0 line 38, there is available a positive value signal which is indicative of the reception by the peak detector 34 of a 0 value signal. In other words, the peak detector 34 takes signals having either positive or negative slopes, indicative respectively of a 1 or a 0, converts them both to relatively positive valued signals and applies them respectively to the 1 line 36 or the 0 line 38 in dependence upon the original type of input. In either instance, there are relatively positive portions of the a signal IP applied to the IP line 40.

In the event that no signal is applied to either the 1 or 0 lines 36 and 38, respectively, then no positive portions of the signal IP appears on the line 40. The signal IP on the line 40 is fed, via a line 42, to the drop-out detector 44. The drop-out detector 44 will be described below in greater detail with respect to FIGS. 7 and 8. Broadly, the drop-out detector 44 only furnishes a signal $\overline{DATA}$ on the line 46 if it does not receive a signal IP at its input within a prescribed period of time. This period of time is such as to establish a worst case condition in the spacing between acceptable signals on the record 20 or the accepted rate of traverse of the recorded signals by the head 26 when passing over consecutive signals. If a signal does not occur within the prescribed period, as will be described below, the drop-out detector 44 causes the system to be reset and an alarm condition to exist whereby an error is signaled. $\overline{DATA}$ is also produced prior to the reading of each successive record 20 and acts as a reset signal.

The signal IP is also applied to a set of flip-flop input control AND gates 50 and 54 via the lines 48 and 52. Each of the input control AND gates 50 and 54 receives a signal G1, to be described below, and, in addition, signals $\overline{T}$ and, T, respectively. The signals T and $\overline{T}$ represent, respectively, the reset and set output signals of the timing flip-flop 56. The input control AND gates 50 and 54, together with the timing flip-flop 56, provide a cross-coupled triggering arrangement, whereby for each input signal IP on the IP line 40, the timing flip-flop 56 changes state, providing the signal G1 is present. The signal G1 will be generated by a sentinel detector flip-flop 58 and gating network to be described.

The sentinel detector flip-flop 58 is initially placed in a set condition by the $\overline{DATA}$ output of the drop-out detector 44 on the line 46. In the reset condition the sentinel detector flip-flop 58 senses the presence of the initial sentinel pattern employed with the record 20. This sentinel pattern consists, as will be described below, of two consecutive 0 recorded signals. It is upon the sensing of this sentinel pattern that the system begins to function. The necessity for the two sentinel signals, in addition to indicating the starting position of a message recording on the record 20, is to establish an original sampling interval for the sampling of the first data signal to follow. This will be described in greater detail below.

The reset output of the sentinel detector flip-flop 58, designated $\overline{F}$, is fed to a first input terminal of an AND gate 60 as well as to a first input of a variable timing control circuit 80, to be described in greater detail below. The AND gate 60 also receives two inhibitory, negative input signals 1SB and 1SA. The signal 1SB is produced by the variable timing control circuit 80 whereas a signal 1SA is produced by the variable timing control circuit 90. Assuming there is present a signal from the reset output of the sentinel detector flip-flop 58, that is the signal $\overline{F}$, and there is absent the output signals 1SB and 1SA from the variable timing control circuits 80 and 90 respectively (i.e. all three inputs to AND gate 60 are positive), then an output signal is produced by the AND gate 60 and applied to a first input of an OR gate 62. The OR gate 62 also receives the output of an AND gate 64. The input signals to the AND gate 64 are the set output signal of the sentinel detector flip-flop 58, that is the signal F, and the 0 output signal of the peak detector 34. The output of the OR gate 62 (signal G1) is fed, via the line 66 to the inputs of the input control AND gates 50 and 54, as has been described above.

The output of the variable timing control circuit 80 is fed, via a line 68 and capacitor 70, to a first input of an OR gate 72. In a similar manner, the output of the variable timing control circuit 90 is fed, via the line 74 and capacitor 76 to the second input terminal of the OR gate 72. The output of the OR gate 72 is designated I-clock. Because of the use of the capacitors 76 and 70, the trailing edge of the signals from the variable timing control circuits 80 and 90 will effect the OR gate 72 to form the output signal. This I-clock signal, formed at the trailing edge of the variable timing control circuit output signals, will act as a clock signal. The I-clock signal is fed, via the line 75, to a storage register 77, to be described in greater detail below, and to the first input of an AND gate 78. The second input of AND gate 78 receives the IP signal on line 40. Applied to the OR gate 82 are the output signals of the drop-out detector 44 (the $\overline{\text{DATA}}$ signal on the line 46) and the input AND gate 50. The output of the OR gate 82 is applied to the set terminal of the timing flip-flop 56.

The 1 signal on line 36 may be stored in the storage register 77 under control of a shift signal applied by the I-clock signal on the line 75. In a similar fashion, the 0 signal on line 38 may be stored in the storage register 77. The AND gate 78 will provide an output signal during any interval of the I-clock signal that it receives a signal IP from the peak detector 34. The output of the AND gate 78 is applied to an inhibitory terminal of an AND gate 86. The AND gate 86 receives at its other terminal a signal (designated TEST from a source not shown). The TEST signal is applied at a repetitive rate from some internal or external clocking source (not shown). This signal will indicate a desired repetition rate during which time the device should be checked to see whether or not signals are received at proper time intervals. If at a clock time a 1 or a 0 is read by the peak detector 34, then the AND gate 86 is inhibited and will not pass the TEST signal to a further OR gate 88. If, however, a signal is not read by the peak detector 34, then the test signal is permitted to pass through the AND gate 86 and the OR gate 88 to set an error flip-flop 92. The error flip-flop 92 immediately signals an error signal on a line 94. An error signal may also be generated as a result of the application of a TEST signal to an AND gate 96. The AND gate 96 receives at its first input the test signal and at its second input the output of the drop-out detector 44 on the line 46. This further indicates that a signal is not received within a prescribed maximum interval and thus an error condition exists. This is not to state that the information received is in error. It indicated, however, that either the information being received is at such a widely disbursed rate that the system cannot interpret it or that there is a total loss of information received by the system. The output of the AND gate 96 is fed, via a line 98, to a second input terminal of the OR gate 88.

Now that the manner of interconnection of the various component portions of FIG. 1 have been set forth, the operation of the system of FIG. 1 will not be traced with the aid of the timing diagrams of FIG. 2. It is assumed that initially information is not being sensed by the system. In this condition the drop-out detector 44 is providing the output signal $\overline{\text{DATA}}$ (note line e of FIG. 2) on the line 46. The $\overline{\text{DATA}}$ signal causes the sentinel detector flip-flop 58 to be placed in a set condition. The sentinel detector 58 produces the output signal F (note line f of FIG. 2). The output signal F is applied to the first terminal of the AND gate 64. In addition, the $\overline{\text{DATA}}$ signal is applied to the first input of the OR gate 82 to cause the timing flip-flop 56 to be placed in the set condition and to produce the output signal T (note line i of FIG. 2). The output signal T from the timing flip-flop 56 is applied to a first input of the variable timing control circuit 80. The variable timing control circuit 80, however, is not operative at this time due to the absence of the input signal $\overline{\text{F}}$ from the sentinel detector flip-flop 58. The sentinel detector flip-flop 58 is set in the F state by the $\overline{\text{DATA}}$ signal. AND gate 96, also receiving the $\overline{\text{DATA}}$ signal, is inoperative due to the absence of the TEST signal.

For this example, it will be assumed that the record 20 is maintained in a stationary condition. The head 26 is moved with respect to the record 20 in the direction of the arrow (shown in FIG. 1). The information signals on line 32 from amplifier 30 are shown at line a of FIG. 2. The outputs of the peak detector 34 are shown at lines b and c to illustrate the signals on lines 36 and 38, respectively. The first recorded information to be found on the record 20 is the first sentinel bit 0. This signal is shown as the pulse S1 on line c of FIG. 2. The output of the head 26 will be fed, via the line 28, to the amplifier 30 and appears in amplified form on the line 32. The signal on line 32 is impressed upon the peak detector 34. The peak detector 34 provides a signal on the 0 line 38 in response to the first positive excursion of the information signal. The 0 signal is applied, via the line 38, to the second input terminal of the AND gate 64. The AND gate 64 also receives the set output, or F signal, of the sentinel detector flip-flop 58. The output of the AND gate 64 is impressed upon the OR gate 62. The OR gate 62 passes the signal G1 (note line h of FIG. 2), via line 66, to the input control AND gates 50 and 54. Due to the timing flip-flop 56 being set and producing the T output signal, the input AND gate 54 receives two of the necessary inputs, T and G1. Peak detector 34 applies the IP signal (note line d of FIG. 2), via line 42, to the drop-out detector 44 causing the signal $\overline{\text{DATA}}$ to be removed (note line e of FIG. 2). The IP signal is also applied via the line 40 and the line 48 to the input control AND gate 50 and, via the line 52, to the input control AND gate 54. With the application of the IP succeeding signals produced in response to the first sentinel information bit, the inputs necessary to operate the input control AND gate 54 are complete. Input control and AND gate 54 applies a signal to the reset terminal of the timing flip-flop 56. The timing flip-flop 56 is thus placed in its reset state and produces the $\overline{\text{T}}$ signal (note line j of FIG. 2). The $\overline{\text{T}}$ signal is applied to the variable timing control circuit 90.

Figure 4:
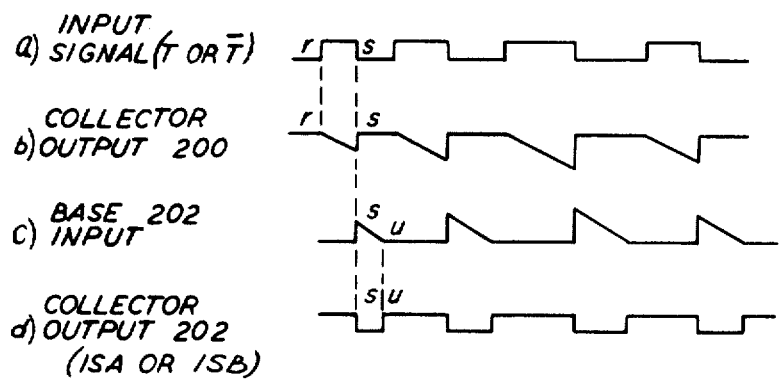
FIG. 4 is a timing diagram showing the time of application of the various input and output signals, as well as the wave shapes of the various signals of the variable timing control device of FIG. 3.

The variable timing control circuit 90, as will be described in greater detail below with respect to FIGS. 3 and 4, is a device which contains a capacitor which is charged up by the signal $\overline{\text{T}}$ for a period equal to the time that the timing flip-flop 56 remains in the reset state producing the $\overline{\text{T}}$ signal. The charging period is shown at line k of FIG. 2 between the points p and q. The variable timing control circuit 90 does not produce an output on the line 74 during this period. Upon the termination of the input signal $\overline{\text{T}}$ to the variable timing control circuit 90, an output is impressed upon the output line 74 for a period proportional to the time during which that capacitor is charged (note line k of FIG. 2 and the discharge time between the points q and r). Thus, at the instant the timing flip-flop 56 is sent to the $\overline{\text{T}}$ state, the variable timing control circuit 90 is in its charging state and does not produce an output on the line 74. The signal $\overline{\text{T}}$ from the timing flip-flop 56 is also applied to an input of the input control AND gate 50. The variable timing control circuit 90 remains in this condition until the second recorded 0 of the second sentinel bit is passed under the head 26.

At the time the second sentinel bit is passed under the head 26 a further signal (note line a of FIG. 2) is passed, via the lines 28, to the amplifier 30. The amplifier 30 transmits an output 0 signal on the line 32 to the peak detector 34. Again the peak detector 34 will pass a 0 signal (note line c of FIG. 2), via the line 38, to the first input of the AND gate 64. The AND gate 64 receives at its second input the set, or F output, of the sentinel detector flip-flop 58. AND gate 64 produces an output which is passed, via the OR gate 62 as signal G1 (note line h of FIG. 2). The signal G1 is immediately impressed upon the input control AND gates 50 and 54. Upon the trailing edge of the input signal being detected by the peak detector 34, the IP signal (note line d of FIG. 2) is placed on the IP line 40 and applied, via the lines 48 and 52, to the input control AND gates 50 and 54. It will be assumed that the head 26 is passed over the record 20 at an acceptable rate of speed such that the signal IP is able to maintain the drop-out detector 44 in its OFF condition such that the $\overline{DATA}$ signal is not produced. The input control AND gate 50 now receives the signal G1, $\overline{T}$ (because the timing of flip-flop 56 is in its reset or $\overline{T}$ state), and the signal IP. Input AND gate 50 now produces an output signal which is passed, via the OR gate 82, to the set side of the timing flip-flop 56. The timing flip-flop 56 produces the T signal (note line $i$ of FIG. 2) and removes the $\overline{T}$ signal (note line $j$ of FIG. 2) from the input to the variable timing control circuit 90. This permits the variable timing control circuit 90 to produce an output for a period proportional to the time flip-flop 56 provided the signal (note line $k$ between points $q$ and $r$ of FIG. 2). At the same time, the output signal T, from the timing flip-flop 56, is applied to the variable timing control circuit 80 and via the diode 100 and the capacitor 102, to the reset side of the sentinel detector flip-flop 58. The T signal is also fed to an input of the input control AND gate 54. Due to the presence of the capacitor 102 the leading edge of the signal T causes the sentinel detector flip-flop 58 to change to its reset state and produce the signal $\overline{F}$ (note line g of FIG. 2). The signal $\overline{F}$ is now applied to the variable timing control circuit 80 along with the signal T from the timing flip-flop 56. The sentinel detector flip-flop 58 now remains in the reset condition producing the $\overline{F}$ signal for the duration of a properly recorded and received message read from the record 20. It is only reset should the information signal be stopped or should there be too long an interval between such signals for the normal acceptable range of the system. At such time, the drop-out detector 44 will provide the $\overline{DATA}$ signal via the line 46 to cause a setting of the sentinel detector flip-flop 58.

From this point forth, during the remainder of valid information signals from the record 20, the AND gate 60 is responsible for the generation of the G1 signal via the OR gate 62. The variable timing control circuit 80, which now receives the T output signal of the timing flip-flop 56 and the $\overline{F}$ signal of the sentinel detector flip-flop 58, begins to charge (note line 1 between points $u$ and $v$ of FIG. 2) and will not produce a signal on the line 68 to either the OR gate 72 or the AND gate 60. It should be recalled from the above description that the variable timing control circuit 80 will continue to charge for a period equal to the length of time that the timing flip-flop 56 remains in the T state. It should be noted at this time that the variable timing control circuit 90 is allowed to charge during the interval that the timing flip-flop 56 remains in the $\overline{T}$ state and produces an output 1SA, as shown on line $k$ of FIG. 2, upon the switching of the timing flip-flop 56 from the $\overline{T}$ to the T condition. This output signal, however is not employed to cause the read-in of information to the storage register 77.

Upon the arrival of the first valid information signal (after the two sentinel bits) at the head 26, whether it be a 0 or a 1, and assuming it comes within the time limits specified by the drop-out circuit 44, it is applied in the following sequence. Assuming the information signal to be a 0, a signal will be available on the 0 line 38, and applied to the AND gate 64. At this time the AND gate 64 is inoperative due to the sentinel detector flip-flop 58 now being in its reset or $\overline{F}$ state. The 0 signal is also applied to the storage register 77. It is not stored at this time due to the lack of a shift or clock pulse 1-clock. At the trailing edge of the signal 0 there is a relatively negative going signal generated on the IP line 40 (this is shown at line d of FIG. 2). The IP signal is applied, via the line 48, to the input AND gate 50 and, via the line 52, to the input AND gate 54. In that the timing flip-flop 56 is in the T state, as a result of the second 0 sentinel pulse, a signal is applied to the T terminal of the input control AND gate 54. The $\overline{F}$ output of the sentinel detector 58 is applied to the AND gate 60. The signals 1SB, from the variable timing control circuit 80, and 1SA, from the variable timing control circuit 90, are each applied to inputs of the AND gate 60. As shown by line k of FIG. 2, the variable timing control circuit 90 is now at its rest period. (The rest period for either of the variable timing control circuits 80 or 90, is that period following the completion of the discharge of their capacitors (as shown, for example, for the variable timing control circuit 90, at line $k$ of FIG. 2, between points $r$ and $s$) and before the next charging period (as shown for the variable timing control circuit 90, at line $k$ of FIG. 2 between points $s$ and $w$). Stated another way, the rest period is the period when either of the variable timing control circuits 80 or 90 is not charging and is not discharging). The variable timing control circuit 80 is still charging (note line 1 of FIG. 2 between points $u$ and $v$), and therefore, does not provide an output signal. Thus, neither of the relatively negative signals 1SA or 1SB are applied to the AND gate 60 to cause it to be inhibited. Therefore, the signal G1 is provided, via the OR gate 62, to the third input terminal of the input control AND gate 54 completing the inputs thereto. Thus, the input control AND gate 54 is caused to apply a signal to reset the timing flip-flop 56. The resetting of the timing flip-flop 56 produces the $\overline{T}$ signal and terminates the application of the T signal to the variable timing control circuit 80.

It should be recalled from the explanation above that the variable timing control circuit 80 contains a capacitor which is charged for a period of time equal to the time that the timing flip-flop 56 remains in the T state producing the T output signal. Upon termination of the T signal at the input to the variable timing control circuit 80, an output is provided on the line 68, to the capacitor 70, the OR gate 72, and to the input of the AND gate 60. The output 1SB from the variable timing control circuit 80 persists for a period proportional to the length of time that its capacitor is charged as a result of the application of the T signal from the timing flip-flop 56. The generation of any further G1 signals is prevented until the discharge period elapses and the inhibitory signal is removed from the AND gate 60. Due to the presence of this inhibitory signal and the resulting inability of the AND gate 60 to pass the signal G1, no further input signal IP can be accepted by the input control AND gates 50 and 54 and the timing flip-flop 56 must remain in its present state. Thus, the charge on the capacitor of the variable timing control circuit 80 serves to set a period during which new information cannot be accepted. This period is determined by the time interval which exists between the second signal of the sentinel pattern and the first information signal. The timing between these signals thus serves as a forecast for the expected time of arrival of the next or second information signal. In a similar fashion, the first and second information signals operate upon the variable timing control circuit 90. These signals cause it to measure the length of time that the timing flip-flop 56 remains in the state. This time is proportional to the time between the sentinel and information signals. The receipt of further information is blocked until a similar time elapses. Upon the completion of the discharge of the capacitor in the variable timing control circuit 80, the inhibitory signal 1SB is removed from the AND gate 60. During this discharge period and the rest period the variable timing control circuit 90 remains in the charging mode and produces no 1SA signal on the line 74 to inhibit AND gate 60. Thus, a signal may be passed by AND gate 60, via the OR gate 62, as the G1 signal the AND gate 50. Assuming the presence of the T and IP signals, the input control AND gate 50 is operative for and placing the timing flip-flop 56 in its set condition (producing the timing signal T). Production of the T signal causes the variable timing control circuit 90 to produce the output signal 1SA. Further, the output 1SB of the variable timing control circuit 80 is applied, via the capacitor 70, to the OR gate 72. The trailing edge of the 1SA signal causes the operation of the OR gate 72 to produce the I-clock signal. The I-clock signal is fed, via line 75, as a shift pulse to permit the storage of a zero in the storage register 77. The I-clock signal is also applied to AND gate 78 to gate the IP signal to the inhibitory input of the AND gate 86. Thus, this signal prevents the TEST signal from passing through the AND gate 86 to set the error flip-flop 92 via the OR gate 88. Thus due, a signal received by the peak detector 34, which comes within the prescribed maximum time period, is accepted, stored, and prevents the setting of the error flip-flop 92 to indicate an erratic condition.

The sensing system continues to operate in the manner described above for each successive signal read by head 26. There is a toggling back and forth between the use of the variable timing control circuits 80 and 90 for alternate signals of the signal train. In each instance, the discharge period of the capacitor of the variable timing control circuits 80 or 90 prescribes the period during which no input information may be accepted and sets the time during which such information may be accepted. Signals coming within this period, that is prior to the permissiveness of the gate 60, are considered to be error signals and therefore not admitted. Further signals, although they may occur at the proper interval of time, which are of insufficient amplitude, are rejected by the peak detector 34 and are considered to be noise. Should a pulse fail to come within the prescribed period, the drop-out detector 44 furnishes the $\overline{DATA}$ signal, via the line 46 to set the sentinel detector 58 back to its set condition (looking for a further sentinel pattern), to cause the OR gate 82 to jam the timing flip-flop 56 back to its initial condition, and to cause the AND gate 96 to permit the passage of the next TEST signal via the line 98. (The TEST signal passes through the OR gate 88 and sets the error flip-flop 92 to provide an error signal via line 94.) It should be noted that an error signal is detected at the end of every record 20. The error signal provides for resetting of the various elements (that is, the sentinel detector 58 and the timing flip-flop 56) for the receipt of the next record bearing information. Thus, error signals received at the end of a record 20 are disregarded. Error signals received during the traverse of the head 26 over the record 20 are treated as such, indicating that an error condition exists.

Turning now to FIGS. 3 and 4, the circuit arrangement for the variable timing control circuits 80 and 90 is shown. For the sake of simplicity and in order to show the variation of the variable timing control circuit 80 with respect to variable timing control circuit 90, the additional element found in variable timing control circuit 80 is shown in dotted form. The inputs and outputs of the circuit 80 are shown with parentheses while the inputs and outputs of the circuit 90 are shown without parentheses. The circuits 80 and 90 are constructed of a pair of PNP transistors 200 and 202 arranged in a grounded emitter configuration. The collector of transistor 200 is coupled by means of a capacitor 204 to the base of the transistor 202. In addition, the collector of transistor 200 is coupled to a terminal 206 to which there is connected a constant current source I, (not shown). The base of transistor 202 is coupled to a terminal 208 to which there is connected a second constant current source I2 (not shown). The collector of transistor 202 is tied, via a resistor 210, to a supply of negative voltage $-V$ (not shown). In addition, the collector of transistor 202 is coupled to the output line to provide the signal 1SA or 1SB, as the case may be. In addition, the collector of transistor 202 is coupled, via a diode 218, to the common point of an input diode OR gate composed of the diodes 220 and 224. In the case where the device represents the variable timing control circuit 90 of FIG. 1, the diode 224 is not present. When it represents the variable timing control circuit 80 of FIG. 1, both of the diodes 220 and 224 are present. The cathodes of the diodes 220 and 224 are connected to input terminals 222 and 226, respectively, to receive the signals (T or $\overline{T}$) and F, respectively. The common point at which the anodes of the diodes 220, 224, and 218 meet is coupled, via resistors 216 and 214, to a supply of positive voltage $+V$. The junction point 212 of the voltage divider, composed of the resistors 214 and 216, is coupled to the base of the transistor 200.

The operation of the variable timing control circuits 80 or 90 of FIG. 3 is now described with reference to the waveforms of these devices as shown in FIG. 4. FIG. 4, line a, shows the input signals T or $\overline{T}$ in accordance with the variable timing control circuits 80 and 90. These signals may be of varying duration but of an amplitude exceeding a predetemined threshold value. It will be recalled from the discussion with respect to FIG. 1, that the length of the input signal T or $\overline{T}$ to the respective variable timing control circuits 80 or 90 is dependent upon the length of time the timing flip-flop 56 is in a particular state. Thus, it is not possible to establish any fixed duration for the input signals as shown at line a. The transistor 200 provides at its collector a negative saw-toothed signal whose perturbation period is coextensive with the duration of the input signal (e.g., FIG. 4, lines a and b between points r and s), and whose amplitude is substantially proportional to the duration of the input signal. At the end of the input signal the charge across capacitor 204 appears as a positive signal applied to the base of transistor 202. This signal has an amplitude equal to the amplitude of the collector output of transistor 200 and a duration proportional to the input signal duration. The output of transistor 202 is a negative pulse whose amplitude exceeds a predetermined threshold value and whose duration is proportional to the duration of the input signal (e.g., FIG. 4, lines c and d, between points s and u). The start of the output at the collector of transistor 202 (i.e., 1SA or 1SB) substantially coincident with the end of the input signal (i.e., T or $\bar{T}$) as at point s in FIG. 4. Line b of FIG. 4, shows the collector output for the transistor 200. Line c shows the base input to the transistor 202. and line d shows the collector output for the transistor 202.

When the input signal, as shown in FIG. 4, line a, is high, it indicates that a signal is being produced by the respective output of the timing flip-flop 56. The transistor 200 is cut off. The capacitor C 204 is charged by a circuit comprising the current source $I_1$ at one end and, at the other end thereof the base-emitter junction of the transistor 202, which is now ON. The voltage on the capacitor 204 will be in a direct linear proportion to the duration of the input signal period of line a of FIG. 4. When the input signal moves negative the collector of the transistor 200 moves towards ground, a positive signal appears at the base of the transistor 202 equal to the voltage on the capacitor 204, and the transistor 202 is maintained OFF. However, the constant current source $I_2$ applied to the terminal 208 now begins to discharge the capacitor 204 and turns the transistor 202 OFF for a period equal to the discharge period of the capacitor 204. It can be seen from FIG. 4, line c, that the base of the transistor 202 is maintained positive at a diminishing fashion for the discharge period of the capacitor 204. During this period of time the collector of the transistor 202 is maintained at a negative level. The duration of the time which the collector of transistor 202 is at a low level is dependent upon the charge upon and, consequently, the discharge time of capacitor 204. Thus, it is not until the capacitor 204 is completely discharged that the output of the collector 202 can return to a relatively positive value and thus permit the operation of the AND gate 60 of FIG. 1.

The waveforms of FIG. 4 may be summarized in the following fashion. The input signal, as shown on line a, indicates inputs exceeding a predetermined threshold amplitude and extending for a duration which is equal to the length of time that the input signal is applied. Line b indicates the charging period for the capacitor 204 as indicated by the collector output of the transistor 200. The terminal 206 moves to an increasingly negative voltage in dependence upon the length of the input time or duration of the input signal. The amplitude of the positive signal on the base of the transistor 202 will approximately equal to the voltage across capacitor 204 at the end of the charging period. The duration of this voltage is (as explained above) dependent upon the duration of the input signal. This positive voltage turns transistor 202 OFF and maintains it OFF until the capacitor 204 is discharged through current source $I_2$. The length of time during which transistor 202 is OFF is dependent upon the voltage on its base and, therefore, upon the duration of the input signal (line a, FIG. 4). In a similar fashion, the length of time that the output of transistor 202 is OFF, producing a negative output, is proportional to the duration of the input signal applied to the transistor 200. To review the output conditions of these transistors with respect to the AND gate 60 of FIG. 1, it should be recalled that the AND gate 60 is maintained inhibited by the output signals of the variable timing control circuits 80 and 90 during the time they are producing these negative signals. Thus the AND gate 60 may only operate after the variable timing control circuits 80 and 90 have fully discharged their capacitors 204 or during the time that their capacitors 204 are being charged, but never during the discharge period.

The constant current source $I_2$ is greater than the constant current source $I_1$ so that the capacitor 204 may be completely discharged prior to the receipt of a next input signal by the transistor 200. It is not essential that be used for sources $I_1$ and $I_2$. However, such use is preferred because there is provided constant current sources more predictable circuit operating conditions and avoidance of problems with respect to transistor parameters effecting the current levels. It should also be noted that the feedback loop, which consists of the diode 218 may be eliminated entirely since the circuit rarely functions with feedback. Thus this connection is insignificant.

Figure 5:
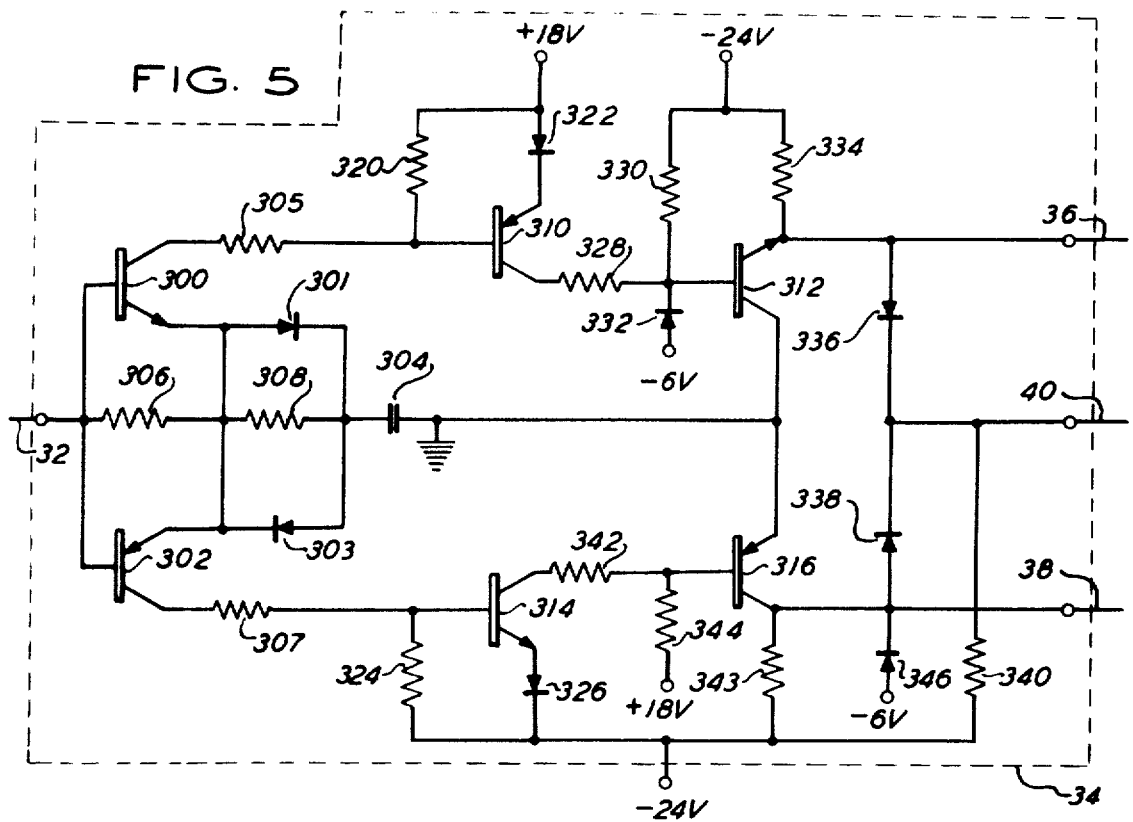
FIG. 5 is a schematic diagram of the peak detector device of FIG. 1.
Figure 6:
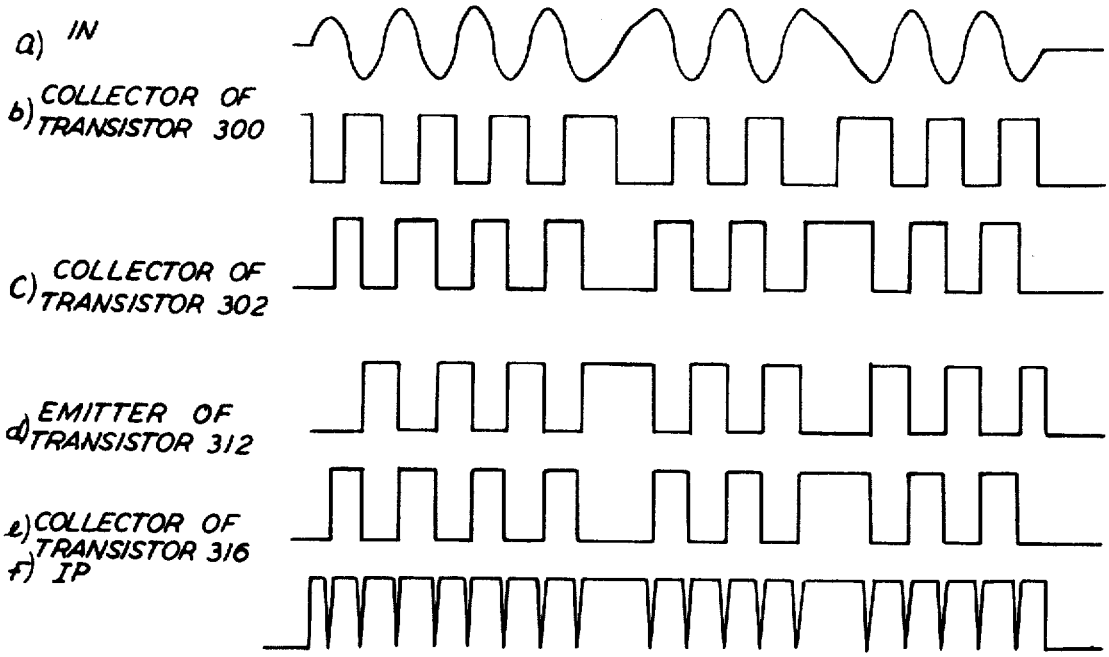
FIG. 6 is a set of waveforms illustrating the manner of operation of the peak detector circuit of FIG. 5.

Turning now to FIGS. 5 and 6, the manner of construction and operation of the peak detector 34 circuit of FIG. 1 may be shown. The peak detector 34 consists of a capacitor 304 which may be charged in a first direction in the presence of a 1 (i.e., when the signal on the line 36 is relatively positive) or in a second direction by the application of a 0 signa (i.e., when the signal on the line 38 is relatively positive). The time during which there is no charging current exists through the capacitor 304 is indicative of the peak condition and permits the production of a signal for gating-out signals on either of lines 36 or 38. In addition, no charging current will exist through capacitor 304 when there is no input signal. An OR circuit is coupled between lines 36 and 38 and is operative at the trailing edge of the 1 or 0 output signals to produce a negative going pulse.

More particularly, the input line 32 is coupled to the bases of a pair of transistors 300 and 302 in emitter-follower, common emitter amplifier configurations. Transistor 300 is an NPN transistor with its emitter coupled, via a diode 301, to a first terminal of a capacitor 304. The transistor 302 is a PNP transistor connected, through a diode 303, to the first terminal of the capacitor 304. A pair of biasing resistors 306 and 308 are also connected between the input line 32 and the first terminal the capacitor 304. In addition, a junction point between two resistors 306 and 308 is coupled, respectively, to the junction of the emitters of the transistors 300 and 302 with the diodes 301 and 303, respectively. The collector of the transistor 300 is connected, via a current limiting resistor 305, to the junction of a resistor 320 and the base of a PNP transistor 310. The cathode of a diode 322 is connected to the emitter of the transistor 310. The other side of the resistor 320 is joined with the anode of the diode 322 to a voltage supply, which can be, for example, in the amount of +18 volts. In a similar fashion, the collector of the transistor 302 is connected, via a current limiting resistor 307 to a resistor 324 and the base of an NPN transistor 314. The anode of a diode 326 is connected in series with the emitter of the transistor 314. The other side of the resistor 324 is connected with the cathode of the diode 326 to a source of voltage, which can be in the amount of −24V. The collector of the transistor 310 is connected to a level shifter. The level shifter consists of a voltage supply which can be −24V, connected to a resistor 330, the collector of the transistor 310 connected to a resistor 328, the anode of the diode 332 connected to a voltage source, which can be −6V, and the common junction of the cathode of the diode 332 and the other sides of the resistors 328 and 330. The common point between the cathode of the diode 332 and the resistors 328 and 330 is connected to the base of a NPN transistor 312. The emitter of the transistor 312 is connected, via a resistor 334, to the −24V supply. Further, the emitter of transistor 312 is connected to the output line 36 and, in addition, is connected to the anode of a diode 336. The diode 336 is part of an OR circuit having a further diode 338. The cathodes of the diodes 336 and 338 are joined in common to the output line 40. In addition, the output point is joined through a resistor 340 back to the −24V supply. The collector of the transistor 314 is coupled, via a resistor 342 to the base of a PNP transistor 316. The emitter of the transistor 316 and the collector of the transistor 312 are coupled and to ground. The collector of transistor 316 is joined to the output line 38 and is also connected to the anode of the diode 338 of the OR circuit. In addition, tha cathode of a diode 346 is joined to the collector of the transistor 316. The anode of the diode 346 is joined to a voltage supply which can be a −6V. The resistors 328 and 330, and the diode 332 form the level shifter from the transistor 310. The transistor 312 is operated as an emitter-follower. The transistor 316 forms a signal inverter for the output of the transistor 314. The output of transistor 316 is coupled through resistor 343 to the −24V supply. The base of the transistor 316 is joined through a resistor 344 to a voltage supply which can be +18V.

With no signal applied, that is during the quiescent state of the circuit, the resistors 306 and 308 maintain the ungrounded end of capacitor 304 at a minimal or substantially zero DC level as the input signal which is applied from the amplifier 30 via line 32, as shown in FIG. 1. The transistors 300 and 302 will operate in order to keep the voltage across the capacitor 304 at approximately a value equal to the input voltage with an input signal impressed upon the line 32. One or the other of the transistors 300 and 302 will operate in dependence upon the polarity of the applied signal. Should the signal be a positive going signal (indicative of a 1), the transistor 300 will be turned ON. A negative going signal (indicative of a 0) will cause transistor 302 to be turned ON. The output of the emitter-follower transistor 300 will charge, via the diode 301, the capacitor 304. Current for this circuit and for charging will be provided via the path including the resistor 320, the diode 322, the transistor 310, and the +18V supply. The current limiting resistor 305 will prevent current caused burnout of the transistor 300. The transistor 310 will operate as a common emitter amplifier drawing its current from the source as noted. In a similar fashion, current will be drawn through the transistor 302 from the parallel combination of the resistor 324, the diode 326, and the transistor 314, via the limiting resistor 307 and diode 303, to the capacitor 304 to charge it in the opposite from that of the previous circuit. Circuits of transistors 310 and 314 supply power to transistors 300 and 302, respectively, for the purpose of placing voltages upon the capacitor 304, to provide (a) a high impedance current supply for low frequency signals and (b) low impedance high current sources for signals of high frequency because of the conduction of transistors 310 and 314.

The circuits employing the diodes 322 and 326 with the transistors 310 and 314 are used as detecting devices to indicate the slope and the existence of peaks of an input signal. The transistors 300 or 302 are ON during an increase or decrease of the input signal and are only OFF at the time that a peak is reached. Therefore, the peak of the input signal is detected by sensing the ON or OFF condition of transistors 310 and 314. The only time, disregarding the NO signal condition, that both transistors 310 and 314 may be OFF is at the peak of the input signal. The lowest operating limit of the peak detector 34 is determined by the slope of an input signal. (The slope is dependent upon the amplitude and the frequency of the input sigal.) Therefore, the minimum slope of the input signal which will operate the peak detector 34 is that slope which acquires sufficient charging current for the capacitor 304 so that either transistor 310 or 314 is in a biased ON condition. The highest operating limit of the peak detector 34 is determined by the limiting effects of the current limiting resistors 305 and 307. Another limitation placed upon the input signal is that the peak-to-peak amplitude must not approach the maximum difference in the positive and negative voltage supplies applied to the collectors of the transistors 300 and 302. To exceed these values would provide for transistor saturation and would destroy the utility of the signals and the circuit. The resistors 328 and 330 together with the diode 332 and the −6V supply provide a clamped level shifter in order that the output of the final emitter-follower stage 312 is properly operated. In a similar fashion and the resistors 342, 344 together with the diode 346 and a similar −6V supply will act as a level shifter and limiter for the base of the inverting transistor 316. This transistor 316 provides the signal indicative of the zero condition. The outputs of the collector of the transistor 316 and the output at the emitter of the transistor 312 are connected together by the diodes 336 and 338 to form an OR circuit. The trailing edge of either a one, or zero signal will operate the gate OR and provide a signal on the line 40 indicative of the fact that a signal, whether it be a one or a zero, has been received. FIG. 6 shows typical waveforms found within the peak detector 34. Line a indicates positive and negative signals as supplied by amplifier 30 representing 1 and 0 input signals. Line b shows the collector output signals of the transistor 300. Line c shows the collector output signals of the transistor 302. Line d shows the output of the transistor 312 at its emitter indicative of the 1 conditions. Line e shows the output of the collector of the tansistor 316 indicating the 0 condition. Line f shows the output at line 40. The negative going pulses are indicative of the peaks of the input signals. The relative positive levels of the signal on line 40 are indicative of either the 1 or 0 input signal (positive or negative slope).

Turning now to FIGS. 7 and 8, the circuit for the drop-out detector 44 and its operating waveforms are shown. As was noted above, the drop-out detector 44 is disclosed and claimed in U.S. Pat. application Ser. No. 147,592, filed Oct. 25, 1961 (now U.S. Pat. No.

3,233,118), in the name of Alan K. Jensen and entitled "Missing Pulse and Busy Signal Control Circuit," and assigned to the assignee of the instant invention. FIGS. 7 and 8 of this application corresponds to FIGS. 3 and 4 that application, respectively. A brief description will be given here for the purpose of completeness. However, reference should be made to that application for a more detailed explanation of the nature of the circuit and its manner of operation. The output of the peak detector 34 is introduced, via the line 42, to a limiting resistor 400 and thence to the base of an NPN transistor 402. The collector of the transistor 402 is tied to a first terminal of a capacitor 404, the anode of a diode 406, and a resistor 408. The other side of the resistor 408 is tied to voltage supply which can be +24V. The emitter of transistor 402 is tied to a resistor 410. The other side of the resistor 410 is tied to the second terminal of the capacitor 404, a further resistor 412, and the base of a transistor 414. The other side of the resistor 412 is tied to a voltage supply which can be in the amount of −18V. The collector of transistor 414 is carried to the output line 46 and through a resistor 416, to a supply of voltage which can be +24V. A further resistor 418 is coupled between the cathode of the diode 406 and the +24V supply. The cathode of the diode 406 and the resistor 418 terminal point are connected, via a variable resistor 420, to the emitter of the transistor 414 and is also connected to ground at a point 422.

The circuit of FIG. 7 operates basically to charge the capacitor 404 if inputs to line 42 are low causing transistor 402 to be OFF and permits the discharge of capacitor 404 if the input signal on line 42 is high causing transistor 402 to be ON. The output of the transistor 402 provides a discharging path during the time that input pulses are high. The transistor 414 provides a charge path for the capacitor 404 during the time that the input pulses are low. If the capacitor 404 is permitted to charge to a voltage which causes diode 406 to conduct, it will cause the transistor 414 to be turned OFF and produce the $\overline{DATA}$ signal on the line 46. FIG. 8 illustrates a typical example. The signal shown in FIG. 8 (i.e. INPUTS and DATA) are the inverse of those disclosed in FIG. 6. It is to be understood that the circuit of FIG. 8 is a "typical example" and by a reverse of polarity of voltages, diodes, and transistors there obviously results an inversion of the signal, as is well known in the art. In line a, a set of inputs at variable times of arrival are applied to the line 42 from the peak detector 34. The first signals 1, 2, and 3 arrive at a normal sequence such that the capacitor 404 is never permitted to charge to a voltage that causes diode 406 to conduct and thus no output signals exist. Line b shows that the output on the line 46 continues to run at a low level output indicative of the absence of the $\overline{DATA}$ signal. A long duration exists between input signal 3 and input signal 4. This long duration permits the capacitor 404 to charge to the voltage that causes diode 406 to conduct. The conduction of diode 406 causes the output signal $\overline{DATA}$ to be applied to the line 46, as shown by the pulse at line b of FIG. 8. Upon the occurrence of the next input signal 4 the capacitor 404 again begins its discharge operation and the $\overline{DATA}$ signal is removed from the output line 46.

Turning now to FIG. 9, a further form of the system is shown. This system is intended to operate with a series of signals such that there will be a setting pulse, or an information input pulse, followed at some regular interval by a resetting pulse. In this manner, certain of the circuitry of FIG. 1 is eliminated with the loss of certain storage facilities upon the record media 20. For example, the requirement for the additional resetting pulse interspaced between information pulses reduces by at least a factor of 2 the storage of information upon the record 20. In certain instances, where a great packing density is not required, the reduction in equipment justifies this loss of storage capacity of the record 20. As can be seen from FIG. 9, the timing flip-flop 56 is retained and its T output is again connected to a variable timing control circuit 90. The reset terminal or $\overline{T}$ output in this embodiment is not connected to a further variable timing control circuit but is instead returned only to a first terminal of the input control AND gate 50. The input control AND gate 54 of FIG. 1 has been eliminated and in its place is found an AND gate 900 which receives the T output signal of the flip-flop 56 together with the reset signal from the peak detector 34 via the line 40. The output of the AND gate 900 is fed to reset the timing flip-flop 56 to its $\overline{T}$ state. In a similar manner, the AND gate 60 of FIG. 1 has been simplified so that the AND gate 902 of FIG. 9 merely requires the input signal $\overline{F}$ from the sentinel detector flip-flop 58 and the output of the variable timing control device 90 (the signal 1SA). Once the initial sentinel conditions have been met, as described with reference to FIG. 1, AND gate 64 is no longer employed to operate the OR gate 62 to cause the generation of the control signal G1. Instead, the output of the AND gate 902 which is employed to generate G1. The first input signal IP on the line 40 will be permitted to pass the input control AND gate 50. This is due to the fact that the signal G1 is already available (due to the arrival of the second sentinel signal) and the fact that the timing flip-flop 56 is in the $\overline{T}$ state. Thus, the output of the input control AND gate 50 will go directly to set the timing flip-flop 56 to its T state and cause the initiation of the variable timing control circuit 90 in the charging mode. The arrival of the second pulse, which will be a reset signal, designated IPR, is applied as an input to the AND gate 900 and will pass there through (the AND gate 900 having received the T signal from the timing flip-flop 56). The IPR signal will thus immediately causes the resetting of the timing flip-flop 56 and initiate the output $\overline{T}$ while stopping the output T. From the description above, the cessation of the input signal to the variable timing circuit 90 will cause this device to produce an output signal for a time proportional to the charge which the capacitor 204 has stored during the time that the timing flip-flop 56 was in its T state (see FIG. 3). Receipt of further information signals is blocked during this time because the output signal 1SA acts as an inhibitory input to the AND gate 902. AND gate 902 is required to provide the G1 signal. When the capacitor 204 of the variable timing control circuit 90 is completely discharged the inhibitory signal will be removed from the AND gate 902 and the $\overline{F}$ signal, present due to the resetting of the sentinel detector 58 of FIG. 1, in the manner described, permits the generation of an output signal. This signal is passed, via the OR gate 62, to produce the G1 signal. The G1 signal permits the acceptance of any further signals on the line 40. To summarize these events, an input signal causes the storage of information by setting the timing flip-flop 56 and operating the variable timing control circuit 90 in a charging mode. The following reset signal terminates the charging operation and initiate the discharge operation. Thus, only after the discharge is completed does the circuit accept any further signals. It can be seen from this description that it is the time between the input signal and the input reset signal which is determinative of the time at which the circuit looks for the next input signal. This is similar to the system in FIG. 1 which also requires two consecutive pulses in order that the timing period be established. In the first instance (FIG. 1) the system requires that two information signals be used whereas in this instance (FIG. 9) an information and reset signal are employed. The system of FIG. 9, however, will not take cognizance of the period between the reset pulse and the next information pulse but is reset again for a further sampling time by the next information signal and reset signal.

The description of the devices of FIGS. 1 and 9 makes a tacit assumption that the head 26, employed to read information from the record 20, is reasonably symmetrical in its response for the information of both types. For example, if the record 20 being read is magnetic, then a polarity of a first type and a polarity of a second type will be reasonably symmetrically interpreted by the reading means. In the event that the reading means is photoelectric it is assumed that the response of the photoelectric reading means, for example, to black and white areas, representing the two possible states of the information, will also be symmetrical. In practice, however, it has been found that photoelectric reading devices due to deterioration over their useful life, in addition to other factors, do not retain the ability to respond symmetrically. For example, the output of a photoelectric reading device when sensing a white area may vary greatly as compared to the output which is achievable when sensing a black area of a record. Thus, certain additional precautions must be taken so that information can be read and the necessary timing signals developed.

Figure 12:
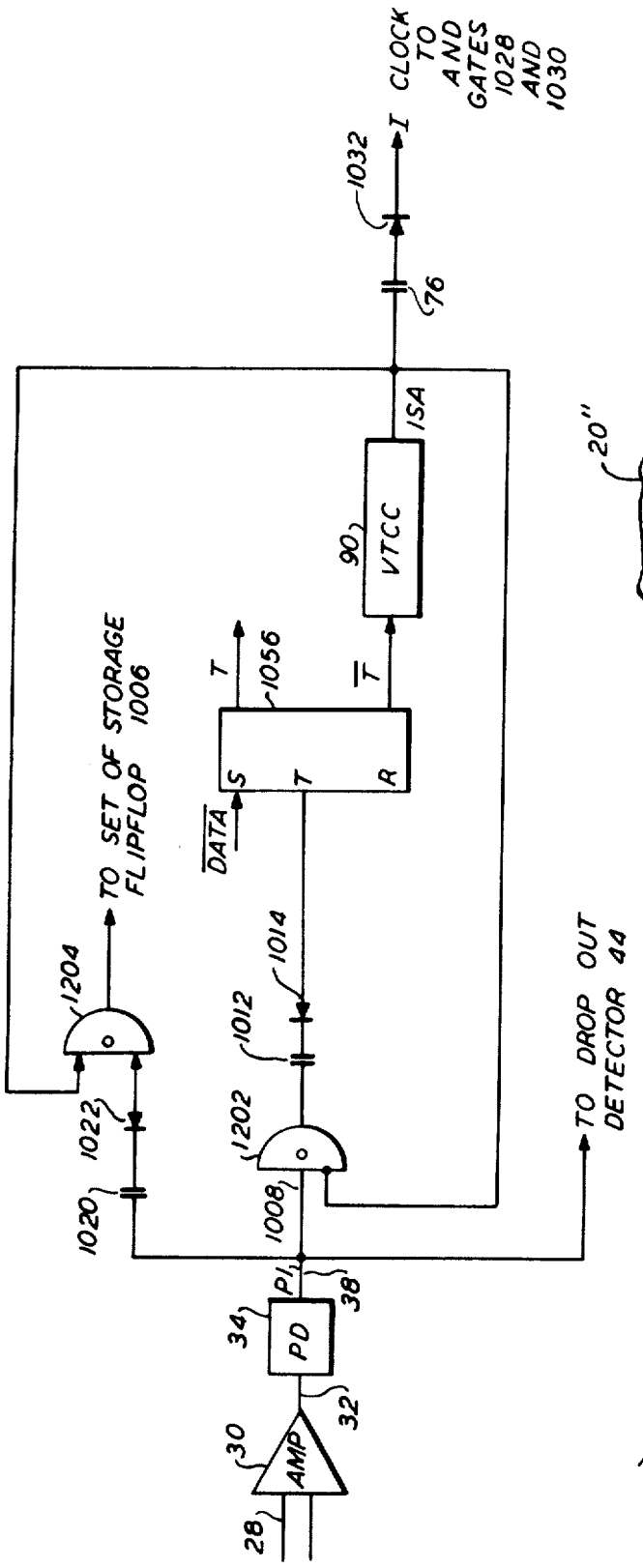
FIG. 12 shows in diagrammatic form an alternative embodiment of the device of FIG. 10 an constructed in accordance with the concepts of this invention.

It has been found that by favoring one particular type of reflective area, which produces the greatest output level regardless of the age of photoelectric transducing eleent, a more satisfactory system can be developed. Thus, in the embodiments to be described below, the information itself is no longer used for timing signals to develop sampling forecasts. Instead timing signals, appearing at regularly spaced intervals, are employed. In the first of the two following embodiments, an information signal may be located between two adjacent timing signals. The timing signals will set up a timing interval during which the system will examine the input signal to determine whether or not there is a signal having an acceptable proper amplitude and duration. Such an acceptable signal will occur between the second of two timing pulses and the next following timing pulse. A further simplification of equipment, with the accompanying reduction in the amount of storage capacity, is achieved in a second embodiment employing a system similar to the embodiment of FIG. 9. In the second embodiment, two timing pulses are arranged to precede the possible inclusion of an information signal. Thus, in an operating sequence for this system, there is received two timing signals. The elapsed time between the timing signal causes a forecast of, or a looking for, an information signal at the end of a period proportional to the elaspsed time interval. In both of these embodiments information signals are also coded according to the best reflective characteristics which can be interpreted by a photoelectric reading means. The presence of an information signal indicates a first condition (i.e., a binary 1 signal). The absence of an information signal at the prescribed time is interpreted as a second condition (i.e., a O binary signal). In the former two embodiments, those of FIGS. 1 and 9, the information signal also acts as at least a portion of the required timing signals. For example, in FIG. 1, the timing is determined by the interval between successive adjacent information signals, whereas in the embodiment of FIG. 9, the timing interval is determined by an information signal and a following timing or reset signal. In either of these instances, if the information signal is of the type which produces a poor output signal (i.e., not readily interpreted by the photoelectric reading means), this information and its timing value is completely lost. This is not true of the instant situation. In the embodiments of FIGS. 10 and 12, to be described below, the timing information is contained apart from actual information signals and is arranged to be of the type best suited for pickup by the photoelectric reading means.

Turning now to FIG. 10a, there is shown a portion of a record 20'. The record 20' is coded according to a technique whereby timing signals are provided at regularly spaced intervals and information signals are distributed between the respective timing signals. FIG. 10a shows a series of black bars with the notation TP below them. The notation TP indicates that these are timing signals generating marks. These black bars are of such reflective character as to maximize the output of the photoelectric reading means and are of uniform width and height, and are evenly spaced along the length of record 20'. The position noted by an "M" indicates the mark or middle of the interspace between respective timing signal bars TP. The absence of a black bar at a mark position is indicative of the presence of a binary O signal at this point. Such a condition is shown at location M1. The presence of a black bar at a mark position is indicative of the presence of a 1 signal, as indicated at position M5. The first two timing bars TP-1 and TP-2 are employed as sentinels to indicate the beginning of the information to be read from the record 20'. This is indicated in FIG. 10a by the bracket and the letter S.

Turning now to FIG. 10, the operation of the system with a record 20', of the type shown in FIG. 10a is set forth. It will be assumed that a photoelectric reading means (not shown) is employed to read the record 20'. Signals from the photoelectric reading means will be fed along the leads 28 to an amplifier 30. The output of the amplifier 30 is fed to a peak detector 34 of construction similar to that described with reference to FIGS. 5 and 6. It is assumed that only the transitions from white to black, which are represented by the negative going portions of the read signal, are of importance and are used to generate timing and information signals. The output signal of the peak detector 34 identified as the P1 signal indicates the photoelectric reading means senses the presence of a black bar. The P1 signal is applied to the drop-out detector 44, of the type described with reference to FIGS. 7 and 8. It should be recalled that the drop-out detector 44 will produce a $\overline{DATA}$ signal indicating the absence of any data being received by it or the fact that no data is received within a predetermined period. The $\overline{DATA}$ signal, as will be recalled, is used as a basic reset for the system and is applied over the line 46 to the set terminal of the sentinel detector flip-flop 58, as well as to an OR gate 1004. The DATA signal is applied, through the OR gate 1004, to the reset input side of a storage flip-flop 1006. DATA signal is also applied via the line 46, to a set terminal of the timing flip-flop 1056.

The output of the peak detector 34 is also applied to a first input terminal of an AND gate 1010, as well as through a capacitor 1020 and a diode 1022 to a first input of a further AND gate 1023. The AND gate 1010 also receives, as two inhibitory inputs, the signal 1SB, provided by the variable timing control circuit 80, and the signal 1SA, applied by the variable timing control circuit 90. The output of the AND gate 1010 is fed, via a capacitor 1012 and a diode 1014, to the toggling input T of the timing flip-flop 1056. The T, or set output, of the timing flip-flop 1056 is applied, via line 1016, a capacitor 102, and a diode 100, to the reset terminal R of the sentinel detector flip-flop 58. In addition, the T output is applied to an AND gate 1018. The AND gate 1018 also receives the reset or F signal from the sentinel detector flip-flop 58. The output of the AND gate 1018 is applied to the variable timing control circuit 80. The 1SB output signal of the variable timing control circuit 80, as has been noted above, is applied to an input of the AND gate 1010. In addition, the output 1SB, from the variable timing control circuit 80, is applied, via a capacitor 70 and a diode 1024, to a first input of an OR gate 1026. The output of the OR gate 1026 is applied to the line 75 as the I-clock signal. This I-clock signal is provided, as will be described below, on the trailing edge of the signals 1SA and 1SB, generated, respectively, by the variable timing control circuits 90 and 80. The T signal, from the timing flip-flop 1056, is applied as the input to the variable timing control circuit 90.

The output of AND gate 1010, after passing through the capacitor 1012 and the diode 1014, is applied as a signal PK to the inhibitory input of the AND gate 1023. The output of the AND gate 1020 is applied to the set input terminals of the storage flip-flop 1006. The set output signal FS of the storage flip-flop 1006 is applied to a first terminal of an AND gate 1028. The AND gate 1028 receives at a second input the I-clock signal on the line 75. AND gate 1028 will provide a signal output for the storage of a 1 in a storage means (not shown). In addition, the output of the AND gate 1028 will be fed through the OR gate 1004 to the reset input terminal R of the storage flip-flop 1006 to reset it. The reset output signal FS of the storage flip-flop 1006 is fed to an AND gate 1030. The AND gate 1030 also receives the I-clock signal on line 75. The presence of both signals produces a O signal for storage. Due to the reset signal applied to storage flip-flop 1006 each time a 1 is read out by AND gate 1028, the flip-flop 1006 will always show a O output signal except when a setting input signal is present.

Figure 11:
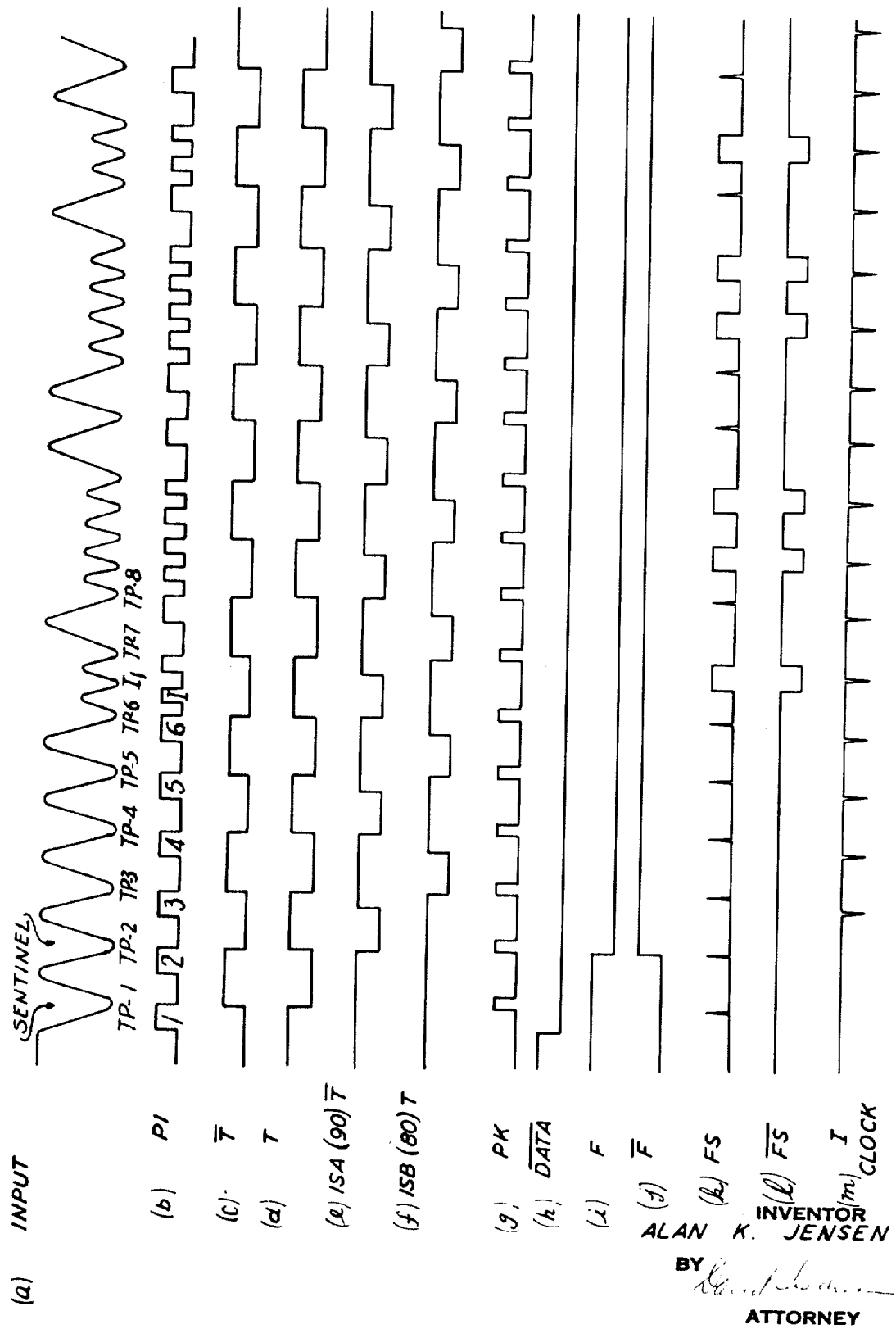
FIG. 11 is a set of waveforms illustrating the manner of operation of the device of FIG. 10.

Now that the components of the device of FIG. 10 have been set forth, the manner of operation of the system is described with reference to FIGS. 10 and 11. Prior to the reading of any record or due to the interval between the reading of a previous record and the reading of the next successive record, sufficient time elapses such that the drop-out detetor 44 produces its output signal DATA (note line h of FIG. 11). The DATA signal: (1) will cause the sentinel detector flip-flop 58 to be set to produce the F output signal; (2) will be applied to the set terminal S of the timing flip-flop 1056 to produce the T signal; and (3) will be applied to a first input of the OR gate 1004 to cause the storage flip-flop 1006 to be reset and produce the FS signal. The FS signal at this time does not pass through the AND gate 1030 due to the absence of the I-clock signal required at its second input terminal.

Upon reading the first timing bar of the sentinel, a signal TP-1 (see line a of FIG. 11) is fed, via the leads 28, through the amplifier 30 and the line 32, to the peak detector 34. The peak detector 34 produces a signal P1-1, which is shown on line b of FIG. 11. The P1-1 signal is applied, via the capacitor 1020 and the diode 1022, to the AND gate 1023. At the same time, the signal P1-1 is fed, via a line 1008, to a first input terminal of the AND gate 1010. The AND gate 1010 passes the P1-1 signal due to the absence of the inhibitory signals 1SA and 1SB. It is assumed that both of the variable timing conrol circuits 90 and 80 are initially at rest. The output of AND gate 1010 is applied through the capacitor 1012 and the diode 1014, and fed, as the PK signal, to the toggling input of the timing flip-flop 1056 as well as to the inhibitory terminal of the AND gate 1023. It is assumed that the signal PK is available at the inhibitory terminal of the AND gate 1023 prior to the arrival of the signal P1-1 through the capacitor 1020 and the diode 1022. Thus, the signal P1-1 is not be permitted to pass through the AND gate 1023 to set the storage flip-flop 1006. The PK signal at the toggling input to the timing flip-flop 1056 causes the timing flip-flop 1056 to change its state and cease producing the T output, as shown in line d of FIG. 11, and commence the production of the T signal, as shown in line c of FIG. 11.

The T signal is applied to the variable timing control circuit 90 to cause its capacitor 204 to begin charging in a manner described above with reference to FIGS. 3 and 4. This charging operation is shown on line e of FIG. 11. Upon the arrival of the second signal of the sentinel, the signal P1-2 is produced by the peak detector 34 (note line b of FIG. 11). The P1-2 signal is passed through AND gate 1010 and results in the production of the signal PK. The signal PK bars the entry of signal P1-2 to the storage flip-flop 1006 to cause it to be set. It should be recalled that the variable timing control circuit 90 produces no output during the charging operation. Variable timing control circuit 80 is at rest, not having been operated thus far. Thus, inhibitory inputs 1SA and 1SB are absent. The output rom the AND gate 1010 causes the timing flip-flop 1056 to toggle and thus produce the T signal and cease the production of the T signal. These signals are shown at lines d and c of FIG. 11. Upon termination of the input signal T to the variable timing control circuit 90, the signal 1SA is produced and applied as an inhibitory input signal to the AND gate 1010, barring the further entry of information to effect the toggling of the timing flip-flop 1056. The T output of the timing flip-flop 1056 is now applied via the capacitor 102 and diode 100 to the reset terminal R of the sentinel detector flip-flop 58 causing the resetting of the sentinel detector flip-flop 58. The reset output F, shown on line j of FIG. 11, is applied, together with the T signal, as shown in line d of FIG. 11, to the AND gate 1018. The output signal of the AND gate 1018 causes the charging of the capacitor 204 of the variable timing control circuit 80. Thus, the sentinel timing signals TP-1 and TP-2 establishes a preliminary timing period for any following information such that the information may not be received by the system unless it falls within a time period proportional to the elapsed time between the sentinel timing signals. The space between the timing signals TP-2 and TP-3 (note line a of FIG. 11) is that space wherein information is to be provided to be read into the system. As is shown in the diagram, no black bar is present between timing signals TP-2 and TP-3. This lack of a black bar indicates that a binary 0 signal is stored therebetween. When the variable timing control circuit 90 finishes its timing out operation and removes its inhibitory signal 1SA from the input terminal of the AND gate 1010, it also applies a signal, which is interpreted through the capacitor 76 and the diode 1032, to a further input of the OR gate 1026 to produce the I-clock signal. The I-clock signal is fed over line 75 to inputs of the AND gates 1028 and 1030. Since the flip-flop 1006 is not set during this time and remains in its reset condition, a signal is received at both inputs of the AND gate 1030 and causes the storage of the 0 signal in a storage means (not shown).

If we now go to the time interval (FIG. 11, line a) described between the timing signals TP-6 and TP-7, we find a further negative signal indicative of a 1 binary information signal. This is a signal representative of information which must be stored by the system as a 1. If no information is contained between the timing signals TP-5 and TP-6 for all intents and purposes the system is in the same condition as after the receipt of both of the sentinel signals TP-1 and TP-2. The timing interval is established by the timing signals TP-5 and TP-6. The variable timing control circuit 90 produces its output signal 1SA (as shown in line e of FIG. 11) for a duration proportional to the elapsed time between the timing signals TP-5 and TP-6. The information signal $I_1$, as shown in line a of FIG. 11, arrives prior to the time that the variable timing control circuit 90 ceases to produce its output signal 1SA. The information signal P1-I, produced as a result of the information signal $I_1$, is applied, via the capacitor 1020 and diode 1022, to the first input of the AND gate 1023. However, at this time, due to the AND gate 1010 being blocked, it is not possible to produce the signal PK and thus cause the inhibiting of the AND gate 1023. The signal P1-I is thus permitted to pass through the AND gate 1023 and cause the setting of the storage flip-flop 1006 to produce the FS signal. This FS signal, as has been described above, is applied to AND gate 1028. The original signal P1-I will end while the signal 1SA is still applied to an input terminal of AND gate 1010. Thus the P1-I signal is not be able to effect the toggling of the timing flip-flop 1056. Upon the completion of the signal 1SA (at line e of FIG. 11), the trailing edge of the 1SA signal is differentiated by the capacitor 76 and the diode 1032, and passes to the OR gate 1026 to provide the I-clock signal. The I-clock signal is applied to the second input of AND gate 1028 and permits the storage of a binary 1 signal. The I-clock signal is shown in line m of FIG. 11. Due to the use of the storage flip-flop 1006, the original P1-I signal, which was to be read into storage, is maintained until such time as it can be read in (note lines k and m of FIG. 11). The arrival of the next timing signal TP-7 causes the device to set a new timing interval dependent upon he length of time between timing signals TP-6 and TP-6. This timing interval is used to search for further information signals between the timing pulse TP-7 and TP-8. It should be noted in this regard that it is assumed that the information signal occurs approximately at the midpoint between the signals TP-6 and TP-7. It has been found in practice that a variation of this timing of approximately 25 percent is possible. However, should an information signal exceed this time and arrive very close to the signal TP-7 it is quite possible that it will not be stored and will go through the AND gate 1010 to cause toggling of the timing flip-flop 1056 giving a completely erroneous result. The information signal is then interpreted as a timing signal and the information signal is lost.

Figure 12A:
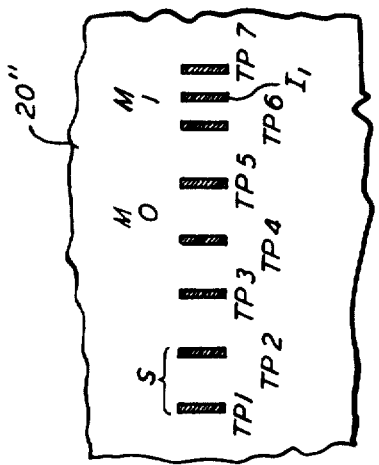
FIG. 12a illustrates in schematic form a portion of the record to be sensed by the device of FIG. 12 and illustrating the signal configuration thereon.

Turning now to FIG. 12a, the record 20'', employed with a variation of the system of FIG. 10a is shown. In this arrangement of the record 20'', two timing signals precede every information signal. As with the device of FIGS. 10a and 10, two sentinel timing signals appear prior to the information content of the record 20''. These sentinel signals are indicated as TP1 and TP2, bracketed and headed with an "S." The timing signals for the first information carrying area are the timing signals TP3 and TP4. The information area is defined as the area between timing signals TP4 and TP5. As shown in FIG. 12a, there is no black bar at this location. Thus, the record 20'' is interpreted as bearing a binary 0 at this point. In the following interval, forecast by the timing signals TP5 and TP6, the information signal can appear in the period between timing signals TP6 and TP7. As shown in FIG. 12a, a signal $I_1$ is found here representing a binary 1 signal. The timing signals TP5 and TP6 will establish the time during which the information signal $I_1$ is searched for.

Turning now to FIG. 12, a system for operating with the record configuration of FIG. 12a is shown. It should be noted that only the elements which represent a change from those shown in FIG. 10 have been illustrated. The remaining portions of the system are similar to that shown in FIG. 10. The output of the peak detector 34 is fed over the lines 38 and 1008 to an AND gate 1202. This AND gate 1202 has a an input joined to the output of the variable timing control circuit 90. The output of the AND gate 1202 is passed, via the capacitor 1012 and the diode 1014, to the toggling input terminal T of the timing flip-flop 1056. The $\bar{T}$ output of the timing flip-flop 1056 is applied to the variable timing control circuit 90. The output of the variable timing control circuit 90 is applied as an inhibitory input signal to the AND gate 1202 and as an enabling input signal to a further AND gate 1204. The AND gate 1204 receives at its second input terminal the output signal from the peak detector 34 via the capacitor 1020 and the diode 1022.

In this configuration, the first timing signal of any group is permitted to pass from the peak detector 34, through the AND gate 1202, and toggle the timing flip-flop 1056 from its initial position of T to $\bar{T}$, causing the variable timing control circuit 90 to begin its charge cycle. Upon the application of the second timing signal of the group, the timing flip-flop 1056 is returned from its $\bar{T}$ state to its T state.

This change in the state of the timing flip-flop 1056 causes the variable timing control circuit 90 to produce the 1SA signal. The 1SA signal inhibits the AND gate 1202 and prevents the receipt by the timing flip-flop 1056 of any further pulses during a time proportional to the interval between the previous timing signals. During the 1SA signal, an information signal received is stored in the storage flip-flop 1006 as a result of the input 1SA being applied to the AND gate 1204 as an enabling input. The same information signal received cannot effect the toggling of the flip-flop 1056 due to the inhibitory action of the output signal 1SA on the AND gate 1202. Thus, for each set of two timing pulses, an interval is measured by the variable timing control circuit 90 after which a search is made for an information signal M. If a black bar is found during the time-out of the variable timing control circuit 90 the resulting information signal is stored in the storage flip-flop 1006 for later admission to the storage means (not shown). This information signal, however, is ineffective to cause toggling of the timing flip-flop 1056. The system must await the receipt of the next timing signal before the operation can be continued.

While there is shown, described, and pointed out the fundamental novel features of the invention as pertains to the preferred embodiments, it is understood that various omissions and substitutions and changes in the form and details of the devices as illustrated and in their operation may be made by those skilled in the art, without departing from the spirit of the invention.

The embodiments of the invention in which the exclusive property of those skilled in the art is defined are as follows:

I claim:

1. A sampling system capable of sampling the signals of a variable frequency signal train, the time of sampling varying in accordance with the elapsed time between th two preceding successive signals of the train, said system comprising:

a circuit input terminal for receiving the train signals;

a storage capacitor;

first detection means coupled to said circuit input terminal to detect when the train signals are moving in a first polarity direction, said first detection means coupled to said storage capacitor and responsive to charge said storage capacitor in a first polarity direction in accordance with the length of time the train signals are moving in the first polarity direction;

second detection means coupled to said circuit input terminal to detect when the train signals are moving in a second polarity direction, said second detection means coupled to said storage capacitor and rsponsive to charge said storage capacitor in a second polarity direction opposite to said first polarity and in accordance with the length of time the train signals are moving in the second polarity direction;

third detection means coupled to said storage capacitor for sensing the charge stored in said storage capacitor and to produce output signals when the stored charge is zero;

first output means coupled to said first and third detection means and in response to said first polarity signals providing a first signal corresponding to said output signal only when the charge in said storage capacitor is zero;

second output means coupled to said second and third detection means and in response to said second polarity signals providing a second signal corresponding to said output signal only when the charge in said storage capacitor is zero;

third output means coupled to said first and second output means for providing a third signal in response to the termination of either said first or second signals;

input terminal means coupled to said third output means to receive said third signal;

gating means coupled to said input terminal means for selectively gating said third signal therethrough;

distributor means having two outputs, said distributor means being coupled to said gating means to receive said gated third signal and providing alternate ones of said signals respectively to each of said distributor means outputs;

a pair of timing control means, each responsive to signals coupled thereto from a separate one of said distributor means outputs and both coupled to said gating means for controlling the operation thereof;

each of said timing control means including means providing for the storage of said coupled distributor output signals;

each of said storage means being responsive to the termination of the respective distributor output signal coupled thereto for initiating the release of the signals stored therein and for causing the respective timing control means to produce an output control signal during the release of said stored signals;

said gating means being responsive to the outputs of said timing control means such that only in the absence of output control signals from both of said timing circuits is said gating means operative to gate the third signal from said input terminal means to said distribution means;

a first of the train signals being gated to said distributor means for initiating a first storage of said one distributor output signal in one of said storage means, the next occurring train signal being gated to said distributor means and causing storage of said other distributor output signal in the other of said storage means, the gating of any further train signals being prevented until the release of the signal stored in the said one timing circuit storage means is completed and prior to an output signal being produced by said other timing circuit.

2. A sampling system capable of sampling the signals of a variable frequency train, the train having information and timing signals arranged in an alternating sequence, the timing signals being uniformly interspaced along the train and between the information signals, the time of sampling the signals varying in accordance with the elapsed time between the previous two sequential timing signals of the train, the system comprising:

input terminal means for receiving the train signals;

first gating means coupled to said input terminal means and operative to selectively gate therethrough the timing signal portions of said train signals;

distributor means having two output terminals, said distributor means being coupled to said first gating means to receive the gated timing signals and in response thereto for alternately providing a corresponding output signal to one of said two output terminals;

a pair of timing control circuits, each responsive to output signals coupled thereto from a separate one of said distributor output terminals and including means providing for the storage of said coupled distributor output signals, each of said storage means being responsive to the termination of the respective distributor output signal coupled thereto for initiating the release of the signals stored therein and for causing the respective timing control circuit to produce an output control signal during the release of said stored signals;

said first gating means being responsive to the outputs of said timing control circuits such that only in the absence of output control signals from both of said timing circuits is said gating means operative to gate the timing signal portions of said train signals from said input terminal means to said distributor means;

a first of the timing signals being gated to said distributor means for initiating a first storage of said one distributor output signal in one of said storage means, the next occurring timing signal of the train being gated to said distributor means and causing storage of said other distributor output signal in the other of said storage means, the gating of any further timing signals of the train being prevented until the release of the signal stored in the said one timing circuit storage means is completed and prior to an output signal being produced by said other timing circuit;

second gating means coupled to said input terminal means for selectively gating therethrough the information signal portions of said train signals, said second gating means being responsive to the timing signal output of said first gating means for inhibiting the passage of said timing signals therethrough; and information signal storage means coupled to said second gating means for receiving and storing said information signals.

3. A sampling system as defined in claim 2 wherein each of said storage means includes a capacitor, each capacitor being charged for a period of time equal to the time the associated one of said distributor outputs has distributor means signals applied to it, said capacitor beginning to discharge upon the removal of said distributor means signal from the associated one of said distributor means outputs.

4. A sampling system as defined in claim 3 said distributor means is a flip-flop having two stable states, said flip-flop being operated by successive timing signal out-puts from said first gating means to change from one of said stable states to the other of said stable states, said flip-flop providing signals on one of said two distributor means outputs in accordance with the one or the other stable states said flip-flop is in.

5. A sampling system as defined in claim 4 and further comprising a peak detecting circuit coupled between said input terminal means and said first and second gating mans for applying signals to said first and second gating means which meet predetermined amplitude conditions.

6. A sampling system as defined in claim 5 and further comprising a drop-out detector coupled to said peak detector for detecting the absence of an output from said peak detector within a predetermined period, said absence of an output indicating the absence of proper signals at said input terminal means, and in response to thereto the output of said drop-out detector being coupled to said flip-flop to prevent the further operation thereof and reset it to an initial stable state.

7. A sampling system as defined in claim 6 and further comprising an alarm device coupled to said drop-out detector, said alarm device being operated by the operation of said drop-out detector at the same time as said flip-flop is reset to said initial stable state.

8. A sampling system capable of sampling the signals of a variable frequency signal train, the train having information and timing signals arranged such that an information signal follows two timing signals, the time of sampling of an information signal varying in accordance with the elapsed time between the previous two adjacent timing signals associated with the information signal of the train, the system comprising:

input terminal means for receiving the information and timing signals of the signal train;

first gating means coupled to said input terminal means and operative to selectively gate the timing signals therethrough;

second gating means coupled to said input terminal means and operative to selectively gate the information signals therethrough;

distributor means having an input coupled to said first gating means for receiving the gated timing signals and in response thereto for providing an output signal coextensive with the elapsed time period between said first and the secnd of said two associated timing signals;

a timing control circuit coupled to said distributor means for receiving said distributor output signal, said timing control circuit including storage means for retaining said distributor output signal for the elapsed time period between said two associated timing signals, said storage means being responsive to the second of said two associated timing signals for initiating the release of the distributor output signal stored therein and for causing said timing control circuit to produce an output control signal during the release of said stored output signal;

said first gating means being responsive to the output of said timing control circuit to inhibit said first gating means from passing therethrough timing signals received at said input terminal means, said second gating means being responsive to the output of said timing control circuit to enable said second gating means to pass therethrough the associated information signal received at said input terminal means; and information signal storage means coupled to said second gating means for receiving and storing the information signals gated by said second gating means.

9. A sampling system as defined in claim 8 and wherein said distributor means is a flip-flop having two stable states, said flip-flop being operated by each of said gated signals to change from one of said stable states to the other of said stable states, in one of said stable states said flip-flop providing said distributor output signal.

10. A sampling system as defined in claim 9 and wherein said input terminal means includes a peak detecting circuit responsive to said variable frequency signal train and operative to only couple said train signals to said first and second gating means which meet predetermined amplitude conditions.

* * * * *

UNITED STATES PATENT OFFICE
CERTIFICATE OF CORRECTION

PATENT NO. : 3,750,108
DATED : July 31, 1973
INVENTOR(S) : Alan K. Jensen

It is certified that error appears in the above-identified patent and that said Letters Patent are hereby corrected as shown below:

Column 1, line 62, "Thus" should be --This--

Column 2, line 14, "aamplitudes" should be --amplitudes--

Column 3, line 58, "appied" should be --applied--

Column 4, line 34, should be space between "the" and "signa

Column 4, line 38, "an" should be --and--

Column 4, line 61, should be "," after indicating

Column 5, line 1, "tranducer" should be --transducer--

Column 5, line 1, after "in" insert --the--

Column 6, line 62, after "76" insert --,--

\*Column 7, line 40, "indicated" should be --indicates--

Column 7, line 48, "not" should be --now--

Column 8, line 37, delete first "and"

\*Column 6, line 66, after "the" insert --I-clock--

UNITED STATES PATENT OFFICE
CERTIFICATE OF CORRECTION

PATENT NO. : 3,750,108
DATED : July 31, 1973
INVENTOR(S) : Alan K. Jensen

It is certified that error appears in the above-identified patent and that said Letters Patent are hereby corrected as shown below:

Column 9, line 27, after "the" insert $--\overline{T}--$

Column 11, line 25, after "signal" insert --to--

Column 11, line 41, delete "due"

Column 12, line 45, "(T or T) and F" should be $--\overline{T}$(or T) and $\overline{F}--$ Column 13, line 16, "202. and line d" should be --202. Line d--

Column 13, line 22, delete "C"

Column 14, line 19, after "that" insert --constant
                 -- current sources -- line 20, delete "constant current sources"

Column 16, line 38, delete "and" insert --,-- line 39, delete "," insert --and--

Column 18, line 48, after "timing" insert --control--

Column 19, line 42, "eleent" should be --element--

Column 20, line 58, after "indicates" insert --that--

UNITED STATES PATENT OFFICE
CERTIFICATE OF CORRECTION

PATENT NO. : 3,750,108
DATED : July 31, 1973
INVENTOR(S) : Alan K. Jensen

It is certified that error appears in the above-identified patent and that said Letters Patent are hereby corrected as shown below:

Column 21, line 39, "1020" should be --1023-- line 40, "terminals" should be --terminal S-- line 41, "$\overline{FS}$" should be --FS-- line 49, "FS" should be --$\overline{FS}$-- line 63, "detetor" should be --detector--

Column 22, line 48, "rom" should be --from--

Column 23, line 24, "1 binary" should be --binary 1-- line 28, after "TP-6" insert --,-- line 64, "he" should be --the-- line 65, "TP-6(second occurrence)" should be --TP-7--

Column 24, line 25, after "0" insert --signal--

Column 25, line 30, "th" should be --the--

Column 25, line 46, "rsponsive" should be --responsive--

Column 26, line 31, "distribution" should be --distributor--

Column 27, line 3, "threto" should be --thereto--

UNITED STATES PATENT OFFICE
CERTIFICATE OF CORRECTION

PATENT NO. : 3,750,108
DATED : July 31, 1973
INVENTOR(S) : Alan K. Jensen

It is certified that error appears in the above-identified patent and that said Letters Patent are hereby corrected as shown below:

<u>Column 27, line 56</u>, "mans" should be --means-- line 65, delete "to"

<u>Column 28, line 26</u>, "secnd" should be --second--

Signed and Sealed this twenty-fifth Day of May 1976

[SEAL]

Attest:

RUTH C. MASON
*Attesting Officer*

C. MARSHALL DANN
*Commissioner of Patents and Trademarks*